United States Patent
Judge et al.

(10) Patent No.: US 9,813,355 B2
(45) Date of Patent: *Nov. 7, 2017

(54) LOGICAL SWITCHES

(71) Applicant: Amazon Technologies, Inc., Reno, NV (US)

(72) Inventors: Alan M. Judge, Dublin (IE); Mark N. Kelly, Seattle, WA (US); Jagwinder Singh Brar, Bellevue, WA (US); Michael David Marr, Monroe, WA (US); Daniel T. Cohn, Oakland, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,699

(22) Filed: Jun. 1, 2016

(65) Prior Publication Data

US 2016/0277320 A1    Sep. 22, 2016

Related U.S. Application Data

(63) Continuation of application No. 13/074,993, filed on Mar. 29, 2011, now Pat. No. 9,363,208.

(51) Int. Cl.
*H04L 12/933* (2013.01)
*H04L 12/931* (2013.01)
(Continued)

(52) U.S. Cl.
CPC .............. *H04L 49/15* (2013.01); *H04L 12/46* (2013.01); *H04L 12/4625* (2013.01);
(Continued)

(58) Field of Classification Search
CPC ....... H04L 49/356; H04L 49/70; H04L 49/40; H04L 49/15; H04L 49/45; H04L 12/46; H04L 12/4625; H04L 45/58
See application file for complete search history.

(56) References Cited

U.S. PATENT DOCUMENTS

| 5,629,685 A | 5/1997 | Allen et al. |
| 5,875,242 A * | 2/1999 | Glaser .................. H04L 41/022 |
| | | 379/115.01 |

(Continued)

FOREIGN PATENT DOCUMENTS

| AU | 2011305638 | 9/2011 |
| CN | 103299287 | 9/2013 |

(Continued)

OTHER PUBLICATIONS

U.S. Non-Final Office Action issued in U.S. Appl. No. 13/963,965 dated Aug. 21, 2015.
(Continued)

*Primary Examiner* — Jeffrey M Rutkowski
*Assistant Examiner* — Mandish Randhawa
(74) *Attorney, Agent, or Firm* — Hogan Lovells US LLP

(57) ABSTRACT

The deployment and scaling of a network of electronic devices can be improved by utilizing one or more network transpose boxes. Each transpose box can include a number of connectors and a meshing useful for implementing a specific network topology. Different tiers of a network can be connected to one or more of the network transpose boxes, and operated as a logical switch. A control server can be used to manage the control plane operations of the logical switch.

20 Claims, 14 Drawing Sheets

(51) Int. Cl.
*H04L 12/46* (2006.01)
*H04L 12/775* (2013.01)

(52) U.S. Cl.
CPC ............ *H04L 45/58* (2013.01); *H04L 49/356* (2013.01); *H04L 49/40* (2013.01); *H04L 49/45* (2013.01); *H04L 49/70* (2013.01)

(56) References Cited

U.S. PATENT DOCUMENTS

| | | | |
|---|---|---|---|
| 6,658,177 | B1 | 12/2003 | Chertkow |
| 7,389,046 | B1* | 6/2008 | Tanaka ................ H04J 14/0283 398/45 |
| 7,390,203 | B2 | 6/2008 | Murano et al. |
| 8,204,061 | B1 | 6/2012 | Sane et al. |
| 8,554,952 | B1 | 10/2013 | Brar et al. |
| 8,621,111 | B2 | 12/2013 | Marr et al. |
| 2002/0126625 | A1* | 9/2002 | Liu .................... H04Q 11/0062 370/254 |
| 2003/0185225 | A1 | 10/2003 | Wirth et al. |
| 2004/0264448 | A1 | 12/2004 | Wise et al. |
| 2005/0108425 | A1* | 5/2005 | Rabinovitch ........... H04L 45/04 709/238 |
| 2006/0029058 | A1 | 2/2006 | Reed et al. |
| 2006/0215687 | A1 | 9/2006 | Lee et al. |
| 2007/0078619 | A1 | 4/2007 | Tsai |
| 2008/0045177 | A1* | 2/2008 | Wise .................... H04W 8/245 455/403 |
| 2008/0126631 | A1 | 5/2008 | Bailey et al. |
| 2008/0315985 | A1 | 12/2008 | Johnson et al. |
| 2009/0213866 | A1 | 8/2009 | Eicker et al. |
| 2010/0095020 | A1 | 4/2010 | Rixner et al. |
| 2010/0115306 | A1 | 5/2010 | Diab |
| 2010/0229067 | A1 | 9/2010 | Ganga et al. |
| 2010/0254652 | A1 | 10/2010 | Kirkpatrick et al. |
| 2010/0254703 | A1* | 10/2010 | Kirkpatrick ........ H04Q 11/0005 398/45 |
| 2010/0306408 | A1 | 12/2010 | Greenberg et al. |
| 2010/0322255 | A1* | 12/2010 | Hao .................... G06F 9/45558 370/398 |
| 2011/0029734 | A1 | 2/2011 | Pope et al. |
| 2011/0191656 | A1 | 8/2011 | Bliss et al. |
| 2011/0268118 | A1 | 11/2011 | Schlansker et al. |
| 2011/0302346 | A1 | 12/2011 | Vahdat et al. |
| 2012/0339161 | | 2/2012 | Allan et al. |
| 2012/0072602 | A1 | 3/2012 | Marr et al. |
| 2012/0102239 | A1* | 4/2012 | Huang .............. H04L 12/40169 710/14 |
| 2012/0243830 | A1* | 9/2012 | Rondeau .............. G02B 6/3851 385/54 |
| 2012/0250679 | A1 | 10/2012 | Judge |
| 2014/0025843 | A1 | 1/2014 | Marr et al. |

FOREIGN PATENT DOCUMENTS

| | | |
|---|---|---|
| EP | 11827362.3 | 7/2013 |
| WO | 02/19616 | 3/2002 |

OTHER PUBLICATIONS

U.S. Non-Final Office Action issued in U.S. Appl. No. 12/888,199 dated Nov. 19, 2012.
U.S. Notice of Allowance issued in U.S. Appl. No. 12/888,199 dated Apr. 1, 2013.
U.S. Notice of Allowance issued in U.S. Appl. No. 12/888,199 dated Sep. 9, 2013.
US Non-Final Office Action issued in U.S. Appl. No. 13/074,998 dated Nov. 9, 2012.
US Final Office Action issued in U.S. Appl. No. 13/074,998 dated May 21, 2013.
US Non-Final Office Action issued in U.S. Appl. No. 13/074,998 dated Sep. 30, 2013.
US Final Office Action issued in U.S. Appl. No. 13/074,998 dated May 19, 2014.
US Non-Final Office Action issued in U.S. Appl. No. 13/074,998 dated Sep. 11, 2014.
US Final Office Action issued in U.S. Appl. No. 13/074,998 dated Mar. 26, 2015.
US Non-Final Office Action issued in U.S. Appl. No. 13/074,998 dated Sep. 11, 2015.
US Notice of Allowance issued in U.S. Appl. No. 13/074,993 dated Oct. 7, 2015.
US Non-Final Office Action issued in U.S. Appl. No. 13/074,993 dated Mar. 26, 2015.
US Final Office Action issued in U.S. Appl. No. 13/074,993 dated Jun. 30, 2014.
US Non-Final Office Action issued in U.S. Appl. No. 13/074,993 dated Nov. 12, 2013.
Canadian Office Action issued in Application Serial No. 2,812,321 dated Oct. 26, 2015.
Canadian Office Action issued in Application Serial No. 2,812,321 dated Sep. 23, 2014.
Canadian Office Action issued in Application Serial No. 2,831,607 dated Jun. 22, 2015.
Chinese Office Action issued in Application Serial No. 201180055970.6 dated Feb. 5, 2015.
Chinese Office Action issued in Application Serial No. 201180055970.6 dated Aug. 21, 2015.
Japanese Office Action issued in Application Serial No. 2014502757 dated Feb. 3, 2015.
EP Supplemental Search Report issued in Application Serial No. 11827352.3 dated Dec. 9, 2014.
EP Supplemental Search Report issued in Application Serial No. 12764676.8 dated Nov. 24, 2014.
PCT International Search Report issued in Application Serial No. PCT/US2011/052356 dated Feb. 9, 2012.
PCT International Preliminary Report on Patentability issued in Application Serial No. PCT/US2011/052356 dated Mar. 26, 2013.
PCT International Search Report issued in Application Serial No. PCT/US2012/030972 dated Jun. 15, 2012.
Singapore Written Opinion issued in Application Serial No. 2013021688 dated Jun. 20, 2014.
Singapore Written Opinion issued in Application Serial No. 201307331-7 dated Nov. 4, 2014.
Cisco, "Data Center Top-of-Rack Architecture Design" Feb. 1, 2009, pages.
Chen, "Chinese Doctoral Dissertations & Master's Theses Full-text Database (Doctor) Information Science and Technology", vol. 2, pp. 1-18, Jun. 15, 2005.
Final Rejection issued in U.S. Appl. No. 13/074,998, dated Jun. 29, 2017.
Extended European Search Report issued in EP Application No. 11827377, dated Jul. 13, 2017.
Examination Report issued in Application No. EP 12764676.8, dated Jul. 18, 2017.
Examination Report issued in Application No. EP 11827352.3, dated Jul. 18, 2017.

* cited by examiner

LOGICAL SWITCHES

CROSS-REFERENCES TO RELATED APPLICATIONS

This application is a continuation of allowed U.S. application Ser. No. 13/074,993 entitled "Logical Switches," filed Mar. 29, 2011, which is incorporated herein by reference for all purposes.

BACKGROUND

As an increasing number of applications and services are being made available over networks such as the Internet, an increasing number of content, application, and/or service providers are turning to networked and shared-resource technologies, such as cloud computing. Further, there is an increasing amount of data being stored remotely, such that data centers are increasingly expanding the amount of storage capacity and related resources. A user or customer typically will rent, lease, or otherwise pay for access to resources through the cloud or across a network, and thus does not have to purchase and maintain the hardware and/or software to provide access to these resources.

In many instances, a customer will require more than one resource, such as a computing device, server, or other computing or processing device, to perform portions of an operation. As the number of customers increases, and the average number of resources per customer increases, there is a corresponding need to increase the available number of resources. In a data center context, this can mean adding many additional racks of servers. In order to accommodate the additional resources, the portion of the data center network that connects those resources to the external network needs to scale accordingly. Such a network can require thousands of connections upon deployment, and the number can increase exponentially upon scaling to a larger deployment. In addition to the significant cost of purchase and installation, the large number of connections increases the likely number of connections that are made incorrectly, and thus can affect the performance of the network.

BRIEF DESCRIPTION OF THE DRAWINGS

Various embodiments in accordance with the present disclosure will be described with reference to the drawings, in which.

DETAILED DESCRIPTION

Figure 1:
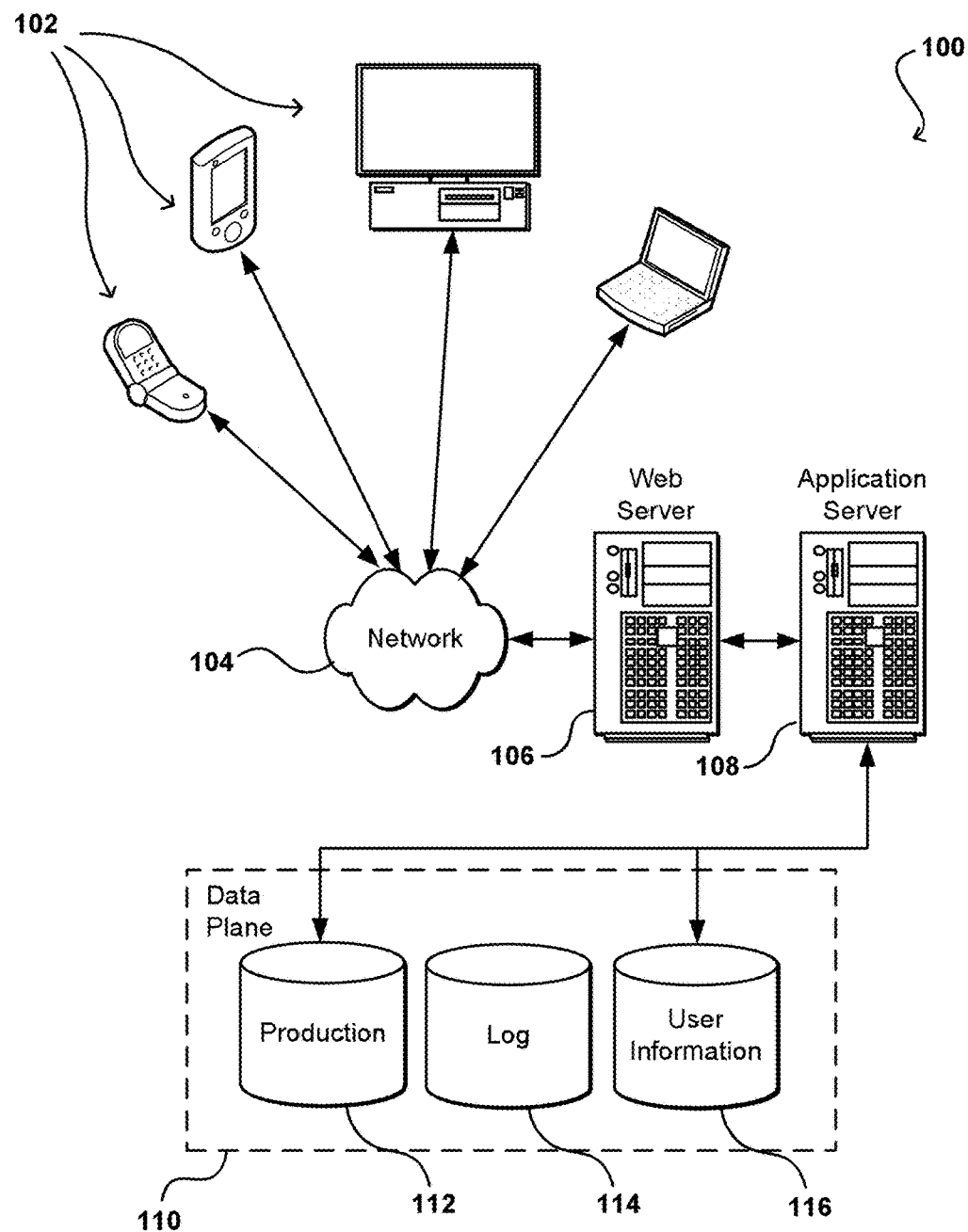
FIG. 1 illustrates an example environment in which various embodiments can be implemented.

Systems and methods in accordance with various embodiments of the present disclosure may overcome one or more of the aforementioned and other deficiencies experienced in conventional approaches to deploying, connecting, maintaining, designing, and/or upgrading a network of electronic components. In computing networks such as data centers, for example, there are many levels (e.g., layers or tiers) of components and many connections between those levels. These can comprise, for example, a hierarchy of network switches connecting various host devices or other resources to an external network. The connections themselves can be made by any appropriate connection mechanism, such as fiber optic cable, network cable, copper wire, etc.

For each connection, a technician or other such person typically must connect the cable (or other connection mechanism) to one device, run the cable over a distance to another device, and connect that cable to the other appropriate device. Oftentimes these distances can be great, such that it can be easy to confuse the cables and end up making incorrect connections. Further, as networks such as data centers can have thousands of components, there is a likelihood that one or more cables will be installed incorrectly.

Further still, various network topologies require significantly more cabling than other topologies. For a high-radix network, for example, each device in a given tier may be fully connected to the devices in an adjacent tier, and there can be orders of magnitude more devices used in a high-radix network than for other types of networks. The result is that there are orders of magnitude more ports and connections, such that the number of cables needed can be significantly more than for other topologies, such as an oversubscribed hierarchical aggregation router pair network.

In various embodiments, a network transpose box or similar component can be used to facilitate the deployment, maintenance, and design of such a network. A network box can include at least two logical sides, including one logical side for each tier or other set of components between which the transpose box sits. Each logical side can include an appropriate number of connectors, each able to accept a connection to a device of the appropriate tier.

The network transpose box also can include cabling, wiring, or other transmission media necessary to connect the connectors on each logical side of the transpose box. Instead of simple pass-through connections or one-to-many connections as in conventional connection mechanisms, a transpose box can be designed in such a way that the transpose box itself implements a selected meshing or network topology. For example, in a Clos network where each switch of a first tier is connected to each switch of a second tier, the full meshing of connections can be handled inside the transpose box. In this way, for at least some transpose boxes, each switch only needs to run one connection (e.g., a multi-fiber cable) to the transpose box, instead of a number of connections necessary to connect to each device of the other tier. In other embodiments, a switch might have more than one connection to the transpose box (as may based at least in part upon factors such as cost, the selected network topology, the cabling technology, and the selected connection approach), but the number of overall cables is still significantly reduced from conventional cabling approaches. For example, the number of cables from a switch might be reduced from 24 or 48 cables to 4 cables or even a single cable, and those cables all go to a single location (e.g., the transpose box or set of transpose boxes) instead of to many different locations in a mesh or other topology. As should be apparent, reducing the number of connections that must be made by a technician to deploy such a network can significantly reduce the likelihood of a cabling error. Further, the reduction in cabling reduces the cost of the deployment, as well as the complexity and cost of scaling the network.

In some embodiments, the likelihood of a cabling error can further be reduced by keying, color coding, or otherwise uniquely identifying at least some of the connections to the transpose box. For example, each logical side of the transpose box can have connectors with a unique color or shape, to prevent a technician from connecting a cable to the wrong logical side (i.e., when all the connectors are on the same side of the transpose box). In transpose boxes that are fully meshed, it may not matter which connector the technician connects to, as long as the technician connects to the proper logical side. In other embodiments, various connectors might have specific keying when specific cables are to be connected to specific connectors. In some embodiments, the keying approach is tied to the network topology, and the number of unique types of keys can increase up to the number of possible types of connections for that topology, or the number of connectors on the transpose box. In some cases, each cable for a given type of connection may be uniquely keyed at each end such that the technician theoretically cannot improperly connect the devices (barring some problem with the cables themselves).

As discussed, the network topology can dictate the type of transpose box implemented in such a network. In some embodiments, the topology can be adjusted by replacing the transpose box. For example, a Clos network might have each device of two tiers connected once to a Clos-meshing transpose box. If the network is to move to another topology, such as a dragonfly or butterfly topology, the technician can swap in an appropriate transpose box with the desired meshing, and reconnect each of the devices to the new transpose box. For complex topologies, the technician might connect multiple transpose boxes, each performing a portion of the meshing necessary for the selected topology.

A network might also implement multiple transpose boxes for redundancy, such that if one transpose box fails the network can still function. Further, the redundancy allows one transpose box to be upgraded or otherwise modified or replaced without significantly affecting the availability of the network. For example, a network architect might want to increase the capacity of the network, and in some embodiments can replace an existing transpose box with a box having more connectors, in order to scale the network. Redundancy allows the box to be replaced without taking down the network.

In other embodiments, a network can use less than all available connectors on a transpose box upon initial deployment, such that at time of scaling the additional devices can connect to the available connectors. In other embodiments, additional transpose boxes can be added to the network, and connected to the existing transpose boxes in order to provide the desired meshing and/or connectivity.

In some embodiments, a logical switch can be deployed using a set of small switches and transpose boxes. More specifically, the set of switches and transpose boxes can be operated in a manner as to appear as a single, unified switch. Each switch, however, can be a fully independent device (e.g., each switch can have its own CPU, power supply, etc.). Furthermore, the switches can have diverse device characteristics. For example, the switches can be of different switch makes and models, run different operating systems, and/or the like. In some embodiments, a control server can manage the operations of the set of switches and transpose boxes using a predefined signaling or routing protocol. By allowing a logical switch to be constructed using a set of small switches and transpose boxes, the cost of deploying and maintaining a network can be reduced.

Various other approaches can be used in accordance with the various examples and embodiments described below.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment can include at least one electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or computing device as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for purposes such as reporting and analysis. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for an electronic marketplace or compute cloud, for example, wherein multiple hosts might be used to perform tasks such as serving content, executing large-scale computations, or performing any of a number of other such tasks. Some of these hosts may be configured to offer the same functionality, while other servers might be configured to perform at least some different functions. The hosts can be grouped together into clusters or other functional groups for the performance of specific tasks, such as may be provided as part of a data center, cloud computing offering, or processing service. The electronic environment in such cases might include additional components and/or other arrangements, such as those illustrated in the configuration 200 of FIG. 2, discussed in detail below.

Figure 2:
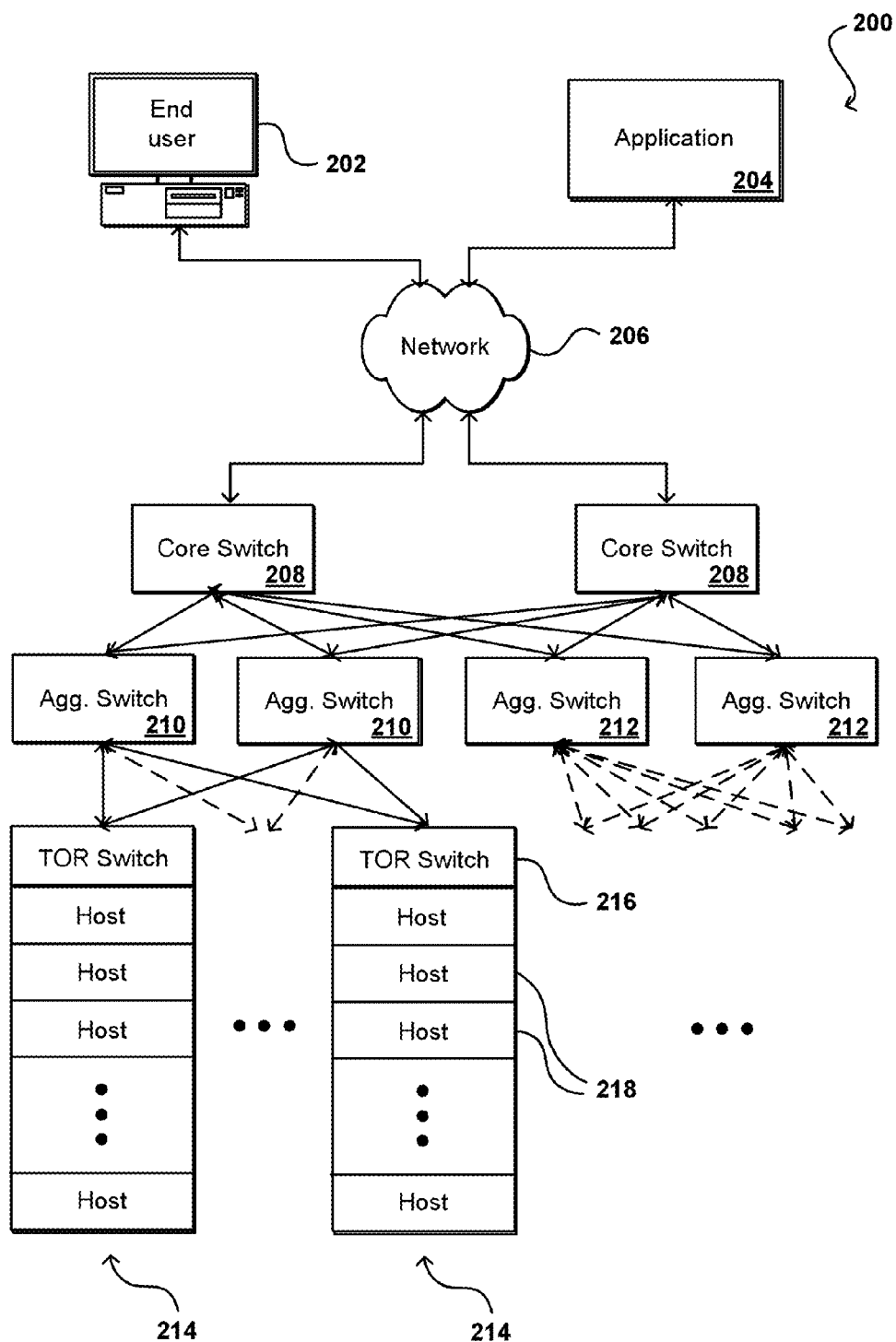
FIG. 2 illustrates an example of a highly connected network design that can be used in accordance with various embodiments.

For example, FIG. 2 illustrates an example configuration 200 that represents a network design that can be used to route requests to specific host machines or other such devices, in order to provide users or applications with access to a variety of distributed resources. This example shows a typical design that can be used for a data center, wherein a source such as an end user device 202 or application 204 is able to send requests across a network 206, such as the Internet, to be received by one or more components of the data center. Properties of various components of the network, such as provisioned instances, etc., can be managed using at least one management system, component, or service 220. In this example, the requests are received over the network to one of a plurality of core switches 208, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 208 is able to communicate with each of a plurality of aggregation switches 210, 212, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 210, 212 is linked to a plurality of physical racks 214, each of which typically contains a top of rack (TOR) or "access" switch 216 and a plurality of physical host machines 218, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 206. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 3:
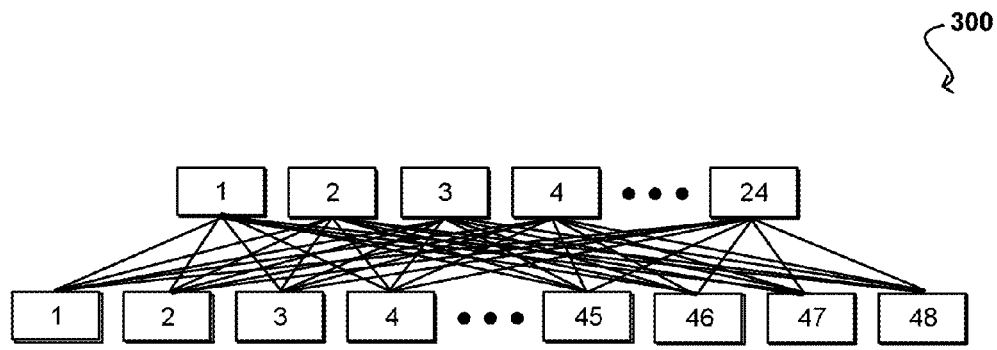
FIG. 3 illustrates an example of a Clos network-style group of switches that can be utilized in accordance with various embodiments.

As discussed, the core switches in FIG. 2 are fully connected to the aggregation switches, and the aggregation switches are configured in pairs that are fully connected to a set of TOR switches. FIG. 3 illustrates an enhanced view of two such fully connected tiers of switches. The design presented illustrates a two-tier folded Clos network. As seen in the configuration 300 of FIG. 3, there are effectively two layers of switches: an upper tier or layer of spine switches and a lower tier or layer of edge switches. At least some of the edge switches (e.g., half of the edge switches in a traditional Clos), however, can be utilized as egress switches which pass data on to the network. The egress switches which logically sit at the "top" of the group of switches and pass data "up and out" of the group, such as to aggregation routers or other devices at a higher level tier. Each of the spine switches can be thought of as having a port out the logical "back" side to one of the egress switches, but the egress switches are simply selected from the forty-eight edge servers illustrated in a folded representation of FIG. 3. The egress switches simply have the only connections out of the group of switches, while the remaining edge switches have connections to underlying devices. All traffic into and out of the group of switches thus is routed through one of the three egress switches, although different numbers of switches can be used in different embodiments.

Even though the network may appear similar to the traditional core switch-based design of FIG. 2, the spine switches in this design function as core switches, but do not have any outbound connectivity. The layers of the group of switches have fully meshed connectivity, however, provided by the spine switches. The group of switches without the egress switches could function as a standalone network without any external connectivity. Thus, some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches, and there is very symmetric behavior. The data within the group of switches can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the group of switches can be replicated multiple times within a data center, for example, wherein a Clos-style network effectively manages traffic across all of the groups in the data center.

Because the switches in the tiers of FIG. 3 are fully connected, such that each device on one tier is connected via at least one connection to each device in another tier, the number of cables needed to deploy such a design can be very large. For example, a single tier alone that contains 24 switches each with 48 ports would require 1,152 cables just to fully connect to the other tier. In a data center with many tiers and/or many more devices per tier, the number of cables quickly goes up to thousands or tens of thousands of cables. In addition to the expense of providing, installing, and maintaining these cables, there is a relatively high likelihood that at least some of the cables will be installed incorrectly. In the example above, 1,152 cables would require 2,304 individual connections. Even with a 99.9% accuracy of installation, this would still result in a couple of connections being installed improperly. Since many data centers run cables through walls, ceilings, floors, or other relatively hidden locations, the accuracy also can depend upon factors such as the labeling of the cables. Each additional step, however, introduces some additional likelihood for error in cabling. For example, if there is a 99.9% accuracy in labeling the cables and a 99.9% accuracy in installing the cables, then there are now likely on the order of four cables that are installed incorrectly.

Further, networks such as those used in data centers often will need to scale over time to provide additional capacity. Using a design such as a high radix interconnection network design can require the number of switches to increase significantly each time the network is scaled, which not only can significantly increase the cost of the network but can also require an extensive amount of new cabling and re-cabling of existing devices. For example, horizontally scaling the deployment of FIG. 2 by adding another pair of core switches that have to be fully connected to twice the number of aggregation switches, which then must each be fully connected to a group of TOR switches as discussed in the example topology, can require a significant amount of work to connect the additional devices. This then further increases the likelihood of cabling errors, as each cable may need to be installed more than one time.

In some conventional networks, connection mechanisms exist that can simplify the cabling process. In one example, incoming fibers can be provided using a fiber bundle, which would require only a single connection for the bundle instead of a separate connection for each cable contained within that bundle. A connection mechanism can accept the fiber bundle on one side, and can connect each fiber within the bundle to a corresponding cable on the other side of the connection mechanism. These connection mechanisms are generally restricted to direct or straight pass-through connections, such that a first incoming fiber ("fiber #1") in the fiber bundle is connected to outgoing connector #1, incoming fiber #2 in the fiber bundle is connected to outgoing connector #2, and so on. Other mechanisms exist that accept a number of cables on one side (e.g., the incoming side) and connect each cable to a single corresponding connector on the other side (e.g., the outgoing side) of the connection mechanism. Such connection mechanisms have no real value in a fully connected network, however, where each switch in one tier is connected to each switch of another tier, which requires many more cables than are needed for single direct connections. There are no connection mechanisms used in conventional networks that provide the fully-connected design needed for high-radix designs and other network topologies as discussed herein.

Figure 4:
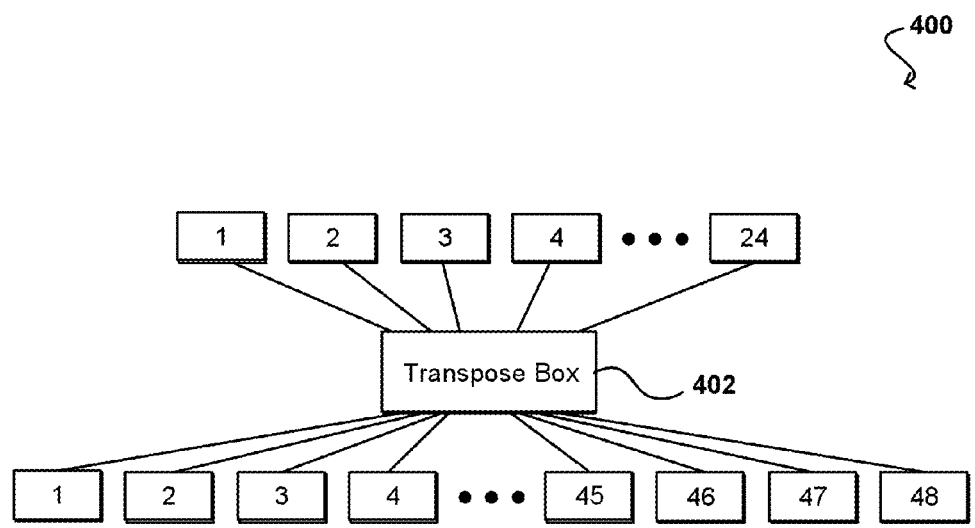
FIG. 4 illustrates an example of a group of switches utilizing a transpose box to make connections between tiers that can be used in accordance with at least one embodiment.

FIG. 4 illustrates an example configuration 400 that can be used in accordance with various embodiments, wherein connections between tiers in a network (e.g., between tiers) can be made using a transpose box 402 or similar network component. In this example, there are 24 spine switches in the upper tier and 48 switches in the lower tier, as in the example of FIG. 3. In the example of FIG. 3, however, each of the twenty-four upper tier switches 404 must be connected to each of the forty-eight lower tier switches 406, for a total of 1,152 cables or 2,304 individual connections that must be made, as discussed above. In the example of FIG. 4, however, each of the twenty-four upper tier switches 404 need only be connected to the appropriate connector on the transpose box 402, resulting in twenty-four cables or forty-eight connections for the upper tier switches 404. The lower tier switches 406 also are each connected only to the appropriate port on the transpose box 402, resulting in forty-eight cables or ninety-six connections for the lower tier switches 406. Thus, by using the transpose box, the number of connections that need to be made to fully connect the tiers of switches is significantly reduced. In some cases, other types of cables (e.g., octopus cables, multi-ended cables, cables with multiple cores, etc.) or combinations of cables (e.g., bundles of similar or different cables) can be used as well, while still obtaining a significant reduction in the amount of cabling and/or number of connections. In one specific example, an uplink cable to a transpose box might have 12 individual port connectors on one end (with two fibers each), and a 24 core trunk cable and a single 24-way connector at the transpose end. Many other variations are possible as well within the scope of the various embodiments.

The transpose box itself can be relatively small. In one example, a transpose box is about the size of a conventional switch, such as may have dimensions of about 19" wide and about 4"-5" deep, as may be able to fit within a conventional network rack. Because fibers are small and flexible, and because the transpose boxes would in many cases be assembled on an assembly line or in a manufacturing facility, many fibers can be configured within a relatively small space. Further, since the transpose box is a self-contained component, there would be substantially no need for an outer protection layer on the fibers within a transpose box, such that even less room is needed for the full-connection design.

Figure 5:
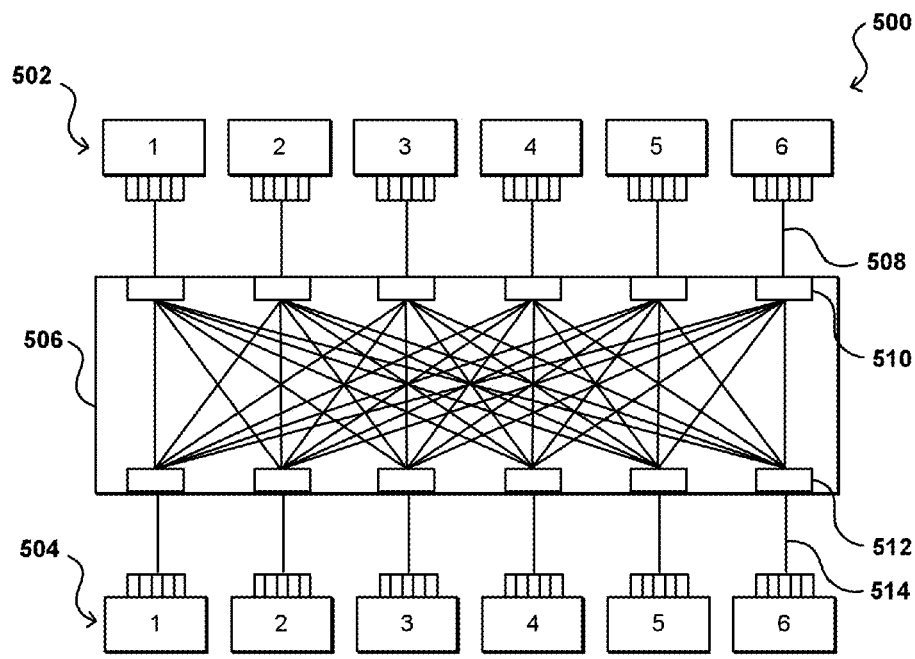
FIG. 5 illustrates the interior connections of an example transpose box that can be used in accordance with at least one embodiment.

FIG. 5 illustrates a simplified example configuration 500 wherein six upper tier switches 502 are fully connected to each of six lower tier switches 504 using a transpose box 506. While there are an equal number of switches in each tier in this example for purposes of simplicity of explanation, it should be understood that there often will be unequal numbers of switches in different tiers, such as twice as many "lower tier" switches in folded Clos-based designs. The transpose box comprises some type of support structure, such as a frame, board, box, rack, enclosure, or other such structure or mechanism for supporting the a plurality of network connectors, each of which is able to receive a network cable for transmitting electronic, optical, or other such signals. As illustrated, the network connections can be arranged on different sides of the support structure, or can be at least partially on the same side or face but separated into different logical groups as discussed elsewhere herein. In some embodiments, the transpose box also can include circuitry and/or components for amplifying or transforming signals as discussed elsewhere herein.

Each of the upper and lower switches in this example can have at least six ports used to make connections to the transpose box 506, in order to make at least one connection for each of the switches in the other tier. It should be understood that the number of ports and/or switches can be different in other embodiments, as conventional switches can utilize as many as twenty-four or forty-eight ports for such connection purposes. Because the transpose box 506 includes cables 516 or other connection mechanisms that provide connections to each of the switches in the other tier, there can be a single connector 510 for each of the upper tier switches 502 and a single connector 512 for each cable 514 connecting the transpose box 506 to one of the lower tier switches 504. In order to simplify cabling, the single cable between each switch and the transpose box can be a fiber bundle (as illustrated by the six individual fibers 518 shown to go into a cable 508) that includes at least one fiber for each connection to be made, such as at least one fiber for each switch in a given tier. In some embodiments, the fiber bundle will include a number of fibers equal to the number of ports on the switches in each tier (or at least a portion of the switches in a tier if different switches are used) such that if additional switches are added there is no need to replace the existing cables. In this example, if there are twenty-four ports on each switch and six switches in each tier, then a cable with twenty-four fibers would allow four individual connections to be made to each switch in the other tier (assuming a corresponding number of redundant connections within the transpose box itself).

As illustrated, each upper tier connector 510 is connected by at least one fiber (or other connection mechanism such as a wire or cable) to each lower tier connector 512, such that the connectors are fully connected. It should be understood that directional terms such as "upper" and "lower" are used for purposes of simplicity of explanation, and should not be interpreted as limiting the scope or implying any necessary orientation unless otherwise specified or suggested herein. Due to the fully-connected nature of the transpose box, each upper tier switch 502 will have a data transmission path to each lower tier switch 504, and vice versa, using only a single cable 508 between the upper tier switch 502 and the transpose box 506, along with a single cable 514 between the transpose box 506 and the target switch 504.

In a simple approach, a single cable passes from each connector on the transpose box to a network component to be connected, such as a switch, server, or physical server rack. The interweaving of the transpose box provides for a meshing (e.g., a full spread fan out or other topology) between any of the layers or tiers of the network, with only one cable (or two connections) per network device. In the event that a transpose box fails, the transpose box can simply be replaced with a different transpose box with at least the number of connections needed to be redone corresponding to, at most, the number of connectors on the transpose box, without any need for running new cable, rewiring, etc.

In some embodiments, there can be a different number of connectors on each logical "side" of the transpose box (e.g., "incoming" and "outgoing" sides, or a logical side facing a first tier and a logical side facing a second tier, logical north and south sides, etc.). It should be understood that these logical sides could actually correspond to any appropriate physical arrangement on the transpose box. An example transpose box could have n connections on one logical side and m connections on the other logical side, where each of the n incoming connections on one side is connected (singly or in blocks) to each of the m outgoing connections. In other examples, each logical outbound connection could be spread across multiple physical connectors, which could be less than the total number of available physical connectors. Various other topologies can be implemented as well. The transposing of the connections can be thought of similar to matrix multiplication, as there can be a matrix of outgoing connections represented as columns and incoming connections represented as rows. In cases where fiber pairs are used for receive and transmit for each pair of connections (e.g., for optical transmission), each row and/or column could be further divided into pairs. The rollover or twisting of pairs of connections is handled within the transpose box, according to the selected matrix, as the rows are effectively converted into columns at the other side, and vice versa.

As discussed, such an approach is advantageous at least for the reason that reducing the number of cables reduces the cost of materials and the cost of deployment (i.e., making the physical connections). An example data center might have 80,000 cables between tiers, and the amount of necessary cabling is such that it typically is measured in tons of material. As discussed above, reducing the amount of cabling can cut the cabling costs by as much as 90% or more, in addition to the savings obtained by using relatively small commodity switches instead of large network switches. On a per-port basis, such a deployment can run around twenty percent or less of the cost of a traditional large-scale network.

Another advantage is that a large reduction in the number of physical connections that must be made results in a corresponding reduction in the likely number of errors when making those connections. When deploying a conventional network, there is a significant operational cost and risk associated with the cabling, both in terms of properly installing the cabling and in maintaining the cabling (e.g., replacing cables when they fail). By utilizing one or more transpose boxes for interconnection, there is no need to connect a switch to every other switch in another tier, for example, but a single connection can be made to the appropriate transpose box from each switch (neglecting for the moment connections "up" to the network or connections to the host devices or other such components). The internal connections of the transpose box provide the full fan-out such that the connected switches will be fully connected between adjacent tiers. And because the transpose box performs the shuffling internally between the ports, cables such as multi-way optical cables can be used which include multiple optical fibers for providing transmit and receive data paths, instead of a large number of single pairs of fiber strands to provide the transmit and receive paths. For an optical cable with twenty-four internal fibers, for example, the twenty-four connections are virtually guaranteed to be correct (barring problems with the cable, for example) as long as the cable is attached to the correct connector on the transpose box.

In order to further reduce the probability of a cabling error for certain types of cabling, approaches in accordance with various embodiments can utilize one or more keying approaches to assist in connecting the cables to the appropriate connector. For example a first keying approach 600 illustrates that each end of a cable can be a different color, such as by having a colored connector, a colored band near at least one end of the cable, etc. In one example, the end of each cable that is supposed to be connected to a switch could be a first color, and the end of the cable that is supposed to be connected to the transpose box could be a second color. Because the transpose box provides full connectivity, it does not matter in at least some embodiments which connector of a logical side of the transpose box the cable is connected to, and such a cabling approach could be used to ensure that each appropriate cable is connected to a switch at one end and a transpose box at the other.

In other embodiments, there might be cables with connectors of different colors to indicate whether the cable is going to a lower tier switch or an upper tier switch. For example, in FIG. 5 each of the lower tier switches 504 should be connected to one of the lower tier connectors 512 and not one of the upper tier connectors 510. In one example, each lower tier connector 512 is a color such as blue, and each cable from a lower tier switch 504 has a connector with a corresponding color, here blue, such that the person connecting the cable to the transpose box knows to connect the cable to the lower connector side of the transpose box. The upper tier connectors 510 can be a different color, such as red, so the person making the connections will be dissuaded from making an improper connection.

In some embodiments, the cables can have different keying approaches 620 instead of (or in addition to) different colors, such as a first keying approach 622 having a notch in a first location and a second keying approach 624 having a notch in a second location. By using different types of notches or other physical keys, cables cannot physically be connected to the wrong connector. Using the example above, each cable from a lower tier switch 504 might use the first keying approach 622, which ensures that the cable can only be connected to one of the lower tier connectors 512 if the upper tier connectors 510 use the second keying approach 624. It should be understood that in some embodiments all the connectors of the transpose box might be on the same side of the component, such that coloring or other distinguishing connector approaches can be further desirable.

Figure 6:
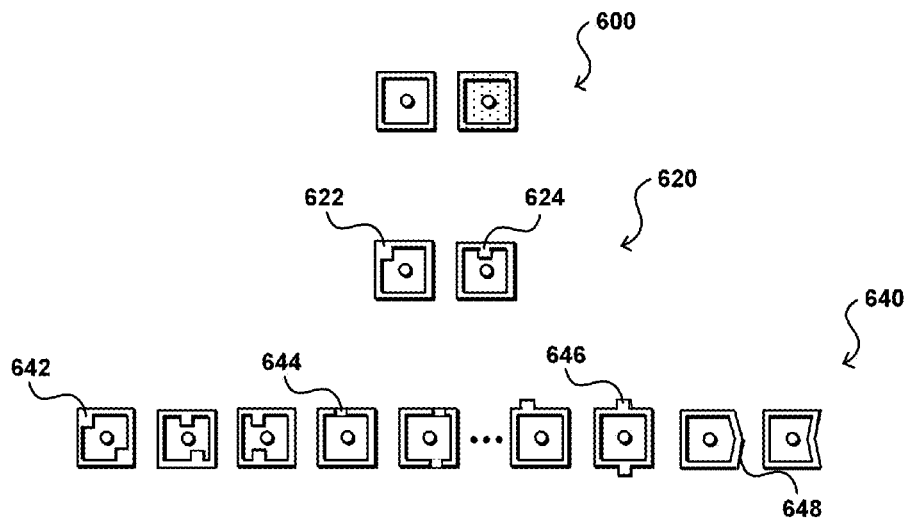
FIG. 6 illustrates example keying approaches that can be used in accordance with various embodiments.

In some cases, the deployment might require (or at least intend) that each switch be connected to a specific connector on the deployment box. In such an instance, there can potentially be a unique keying used for each switch within a selected group of switches. For example, a number of different types of keying 640 are shown in FIG. 6, including approaches with extension portions within the connector 642, approaches with notches or cut-outs 644, approaches with extension portions outside the connector 646, and/or approaches utilizing irregularly shaped connectors 648, such that each cable can only be connected to a particular switch and a particular connector on the deployment box. It should be understood that approaches can be reused for other groups of switches and/or other portions of the network where mis-cabling due to repetition of keying is at least highly improbable.

It also should be understood that while each connector shown in FIG. 6 might appear to have a single cable or fiber at the center, there can be many different configurations and types of connector. For example, a pair of fibers might result in side-by-side fiber endpoints, while a bundle of fibers might have several adjacent fibers within the same fiber bundle, or as portions of a single optical fiber. In other cases, each fiber might have a separate endpoint at the connector. MPO connectors, for example, can be used that are of different density, asymmetrical, or otherwise distinctive. There can be more fiber pairs, or more fiber cores, handled in one type of connector than another. The connectors can handle normal Tx/Rx fiber pairs, or any of a number of multi-path or multi-way fibers or cables. A variety of other options also can be used as should be apparent.

It also should be understood that while many examples provided herein relate to optical fibers and fiber-optic communications, approaches in accordance with various embodiments also can be used for other types of electronic signaling and/or data transfer as appropriate. For example, a transpose box can be used with electrical wiring, such as an active or passive transpose box for 10GBASE-T cable. In addition to providing the desired meshing, an active transpose box could also amplify or regenerate the signals in order to enable the signals to propagate over longer distances. Transpose boxes can also be used with twisted pair cables and a wide variety of communication or transportation media, such as 10GBASE-KR or 10GBASE-KX4, edge connectors, and custom cabling.

Further, other types of transpose boxes may be used that do not provide full meshing or full connectivity along a pure Clos-based design. For example, a transpose box might provide a specific number of straight pass-through connections (particularly for amplifying electrical signals). In other examples, the transpose box could be wired to help implement a different network topology, such as a dragonfly or butterfly network topology wherein a portion of the connections on one logical side of the box loop back to other connectors on the same logical side. In some examples, a cable out might have double capacity and accept information from two incoming cables. In some embodiments, the network topology can be selected and/or updated through selection of the transpose box to be implemented to perform the meshing.

Depending upon the type of cabling or other such factors, the type of connector(s) used also can help to ensure proper orientation of the cable at the connector. For example, 10GBASE-T uses a single type of key for all connectors in order to ensure that the cable is installed with the proper orientation (such that each individual wire/fiber within the cable is connected to the appropriate location in the case of multiple wires/fibers being used). Such orientation-based keying can be used in combination with color-based keying, for example, to ensure that the cable is being connected at an appropriate location with the correct orientation. Various other keying approaches can be combined as well as discussed elsewhere herein. While two types of keying might be sufficient for a full fan-out from a north face to a south face of the box, the keying strategy can become more complicated as the complexity of the network topology increases. For example, a dragonfly network topology might utilize a local mesh and a global mesh, each with a distinct set of keying mechanisms. Thus, the keying approach in at least some embodiments is selected based on the topology implemented, and there can be a number of key classes up to, and including, a unique key for each connector of the topology.

In some embodiments, a transpose box can enable different types of cables and/or connections on each logical side of the box. For example, the transpose box could contain circuitry and/or components to regenerate the signal received on one side for transmission using a different type of signal on the other side. In one example, optical fibers could be attached at a north side of the transpose box, with copper wire being attached at a south side of the transpose box, and the transpose box could perform the appropriate media conversion. In a specific example, 1GBASE-T connections can be used between data servers and a transpose box, with fiber channels being output from the transpose box in order to provide for long distance communications (e.g., communications over the Internet or from a server room of a data center to the centralized network switches). Since fiber optics are currently much more expensive than copper wires, such an approach can provide the advantage that copper wire can be used to the extent possible, and then optical fibers used when necessary (with no meshing of those optical fibers being necessary, as the meshing is done by the transpose box, thus reducing the number of fibers needed). In some embodiments, a transpose box could even convert between physical and wireless connections, with each physical connection being meshed with an appropriate wireless signal or channel.

Another advantage to using transpose boxes as discussed herein is that the expertise and complexity of the network topologies is being centralized into the creation of the boxes. By implementing such functionality, a data center technician does not need to understand the complexities of the various topologies, and instead only has to select and install the appropriate transpose box (which implements the appropriate topology). Further, the transpose boxes can quickly and easily be tested during the manufacturing process (such as by ensuring that a proper signal is transmitted between appropriate connectors), such that there are no surprises or complex troubleshooting processes required for this portion of the network installation. If there is a network problem, a new box can be swapped in relatively quickly (e.g., on the order of eight minutes or less) to determine whether the box is the problem, as opposed to a lengthy process of testing all the individual cables and connections of the mesh. Such an approach also allows spare cabling to be run to the transpose box (instead of to the final destination) if all the ports are not to be used immediately. If one side (e.g., the north side) is fully wired to the existing infrastructure, scaling the network to add additional components at the south side then can be accomplished by connecting the new components directly to the transpose box.

Figure 7:
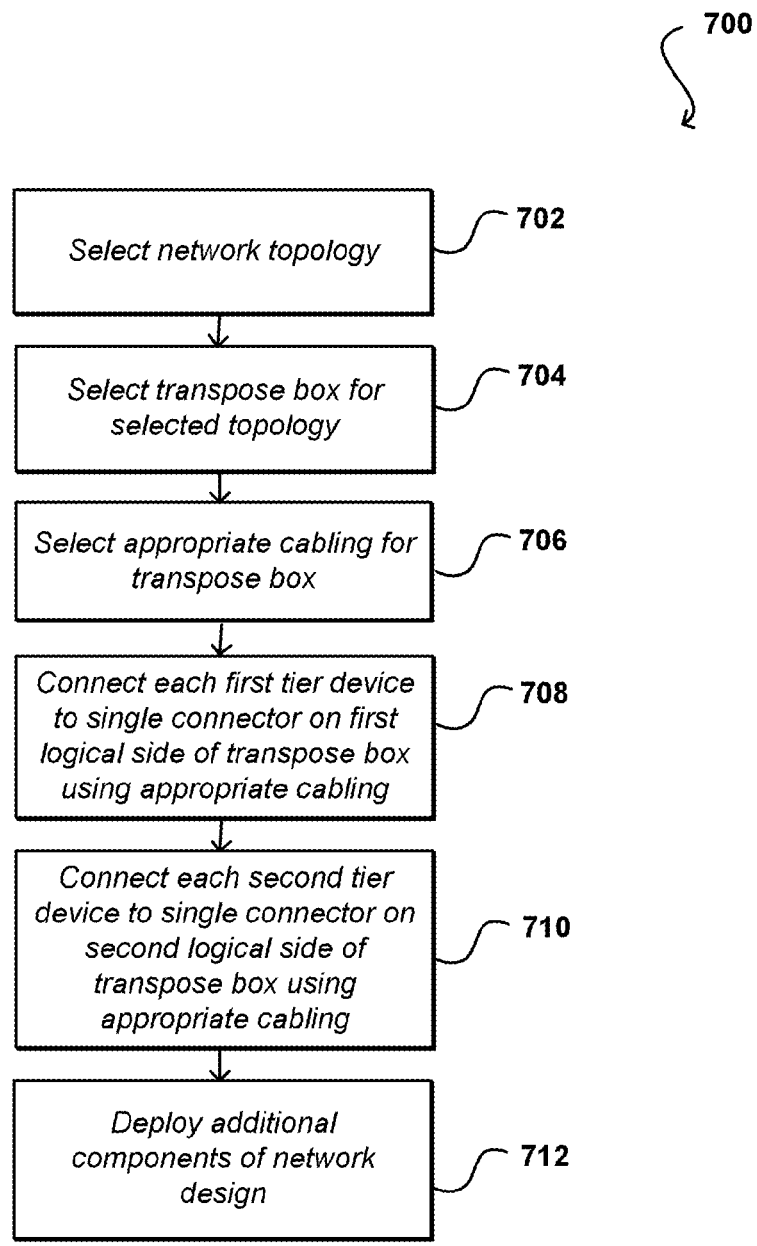
FIG. 7 illustrates an example process for utilizing a transpose box to make connections between tiers that can be used in accordance with at least one embodiment.
Figure 8A:
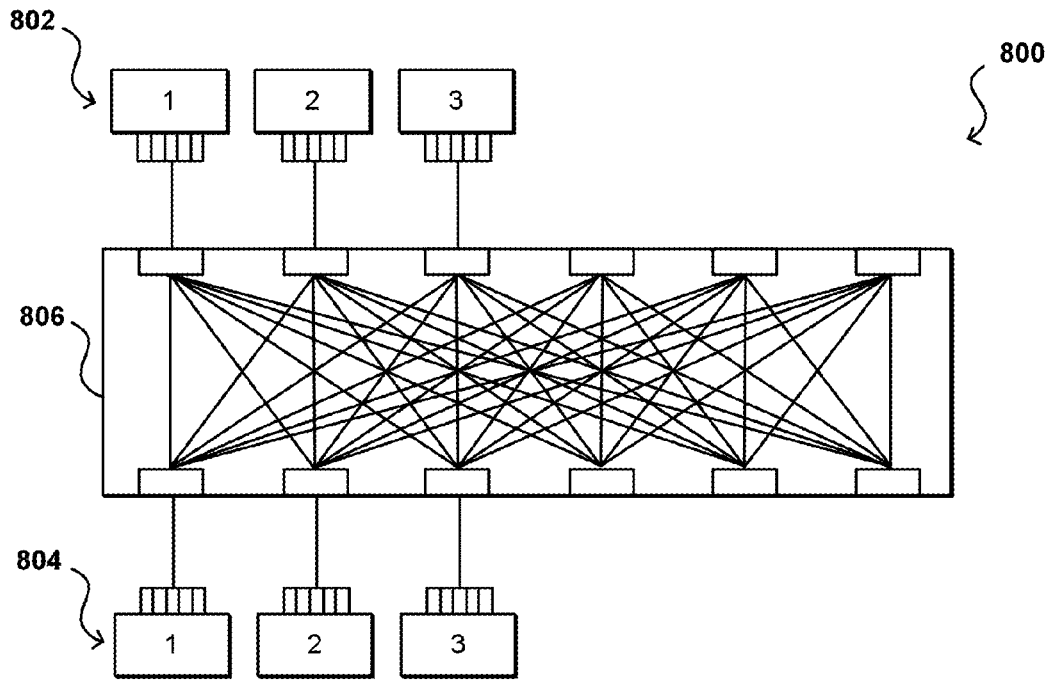
FIGS. 8(a)-8(d) illustrate approaches for scaling the number of network devices using a transpose box that can be used in accordance with various embodiments.
Figure 8B:
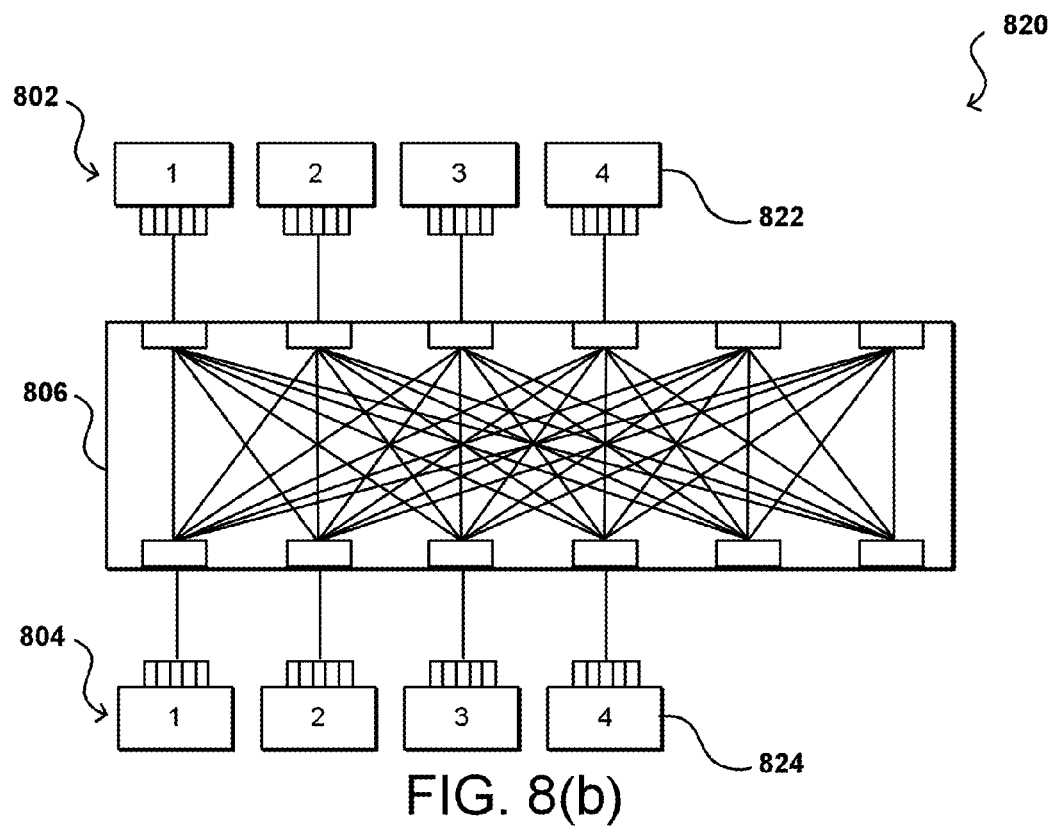
Figure 8C:
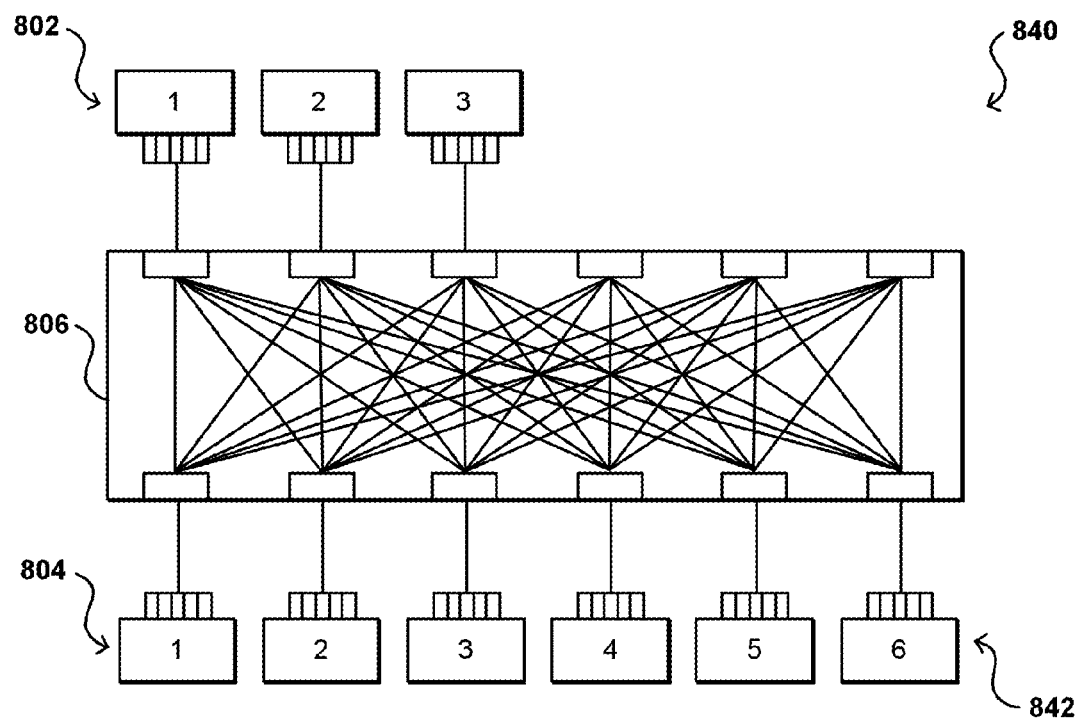
Figure 8D:
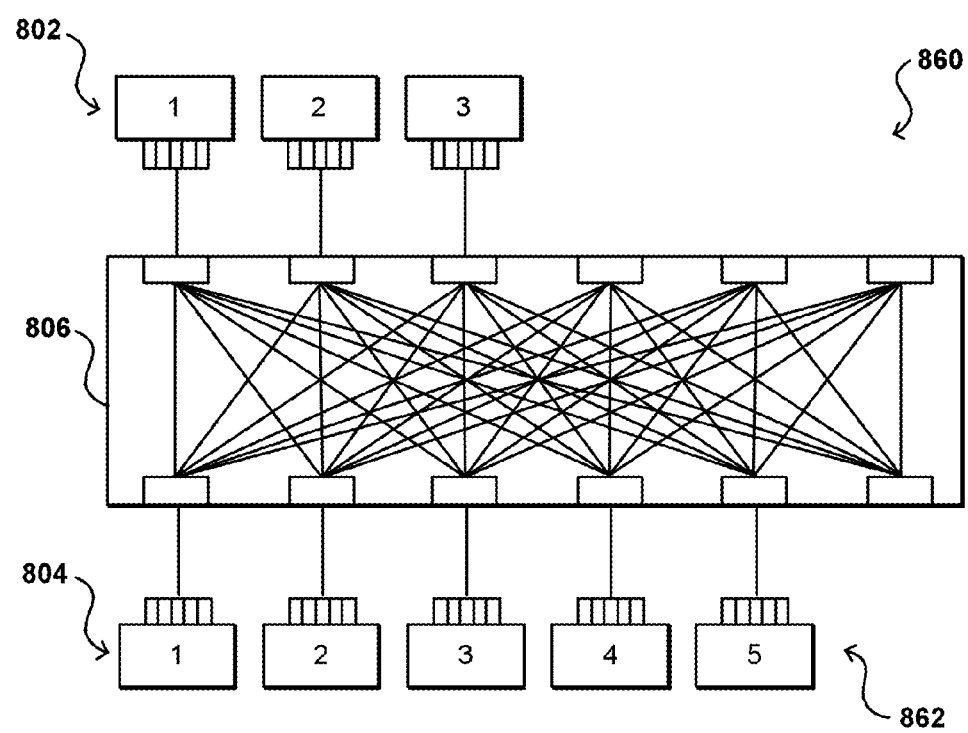

FIG. 7 illustrates an example of a process 700 for deploying at least a portion of a network using at least one transpose box in accordance with at least one embodiment. In this example, a network designer, or other appropriate person first selects a type of network topology to be utilized for a specific network portion 702, such as a Clos-based portion as discussed above. Based on the selected topology, a corresponding transpose box is selected 704, as the meshing inside the transpose box implements that topology. The appropriate cabling for the transpose box (and number of network devices to be connected) is selected 706. As discussed, a transpose box can include different types of keying, and the number and types of cabling selected can depend upon factors such as the number and type of connectors on the transpose box. If the transpose box has different types of cabling on each logical side (e.g., optical fibers vs. copper wiring), then appropriate fibers, wires, or cables are selected and/or created and transceivers, media converters, or other necessary electronics can be inserted into the signaling path. Each first tier device (e.g., switch) is connected to an appropriate port on the first logical side of the transpose box 708, as may be dictated by the keying of the cabling and/or connector. Each second tier device (e.g., switch or network host) is connected to an appropriate port on the second logical side of the transpose box 710, as may be dictated by the keying of the cabling and/or connector. It should be understood that for this and other processes discussed herein, alternative, additional, or similar steps can be performed in similar or alternative orders, or in parallel, within the scope of the various embodiments unless otherwise stated. Once the devices of the selected tiers are connected to the transpose box, any remaining network components can be deployed 712 such that the network can be utilized for its intended purpose.

As mentioned, over time there often will be a need to scale or increase the size of the network deployment. In conventional systems, this often involves a significant re-cabling of the network. For example, if a group of switches has twenty-four first tier switches fully connected to twenty-four second tier switches, and twenty-four more switches are added to one of those tiers, then around 288 cables need to be moved and/or added just for that group alone. If, however, a transpose box capable of handling forty-eight switches on one logical side was used with a single cable connecting each device to the box, then only twenty-four new cables would need to be added as each additional device would simply need to be connected to the correct connection on the transpose box. Again, this is on the order of a 90% improvement over existing approaches. Further, a transpose box allows for incremental scaling that would be difficult using conventional approaches.

For example, FIG. 8(*a*) illustrates an example deployment 800 wherein there are three upper tier switches 802 fully connected via the transpose box 806 to each of three lower tier switches 804. In this example, a transpose box is initially (or subsequently) deployed that is able to handle more switches than are connected during the initial deployment. As can be seen, each of the devices is still fully connected to each device of the other tier.

If, for example, the network architect would like to scale to include an additional switch in each tier, the architect can direct the technician to add a switch to each tier, and connect each switch to the appropriate connector on the transpose box. As can be seen, the new upper tier switch 822 is connected to a corresponding connector on the upper side of the transpose box, and the new lower switch 824 is connected to a corresponding connector on the lower side of the transpose box. Because the transpose box in this example fully meshes the connectors on each side, each new switch is fully connected to all switches on the other side even though only a single additional cable was needed for each switch. In a conventional system (assuming adding a single switch to each tier is even an option), this would require at least one cable from each new switch to each switch of the other tier, for at least seven different cables (ignoring any issues with oversubscription, balancing, or other issues with other portions of the network).

As illustrated in the example configuration 840 of FIG. 8(*c*), the use of a properly meshed transpose box also can allow for asymmetric scaling of the network (where appropriate). In this example, the network can be scaled such that three additional lower tier switches 842 are added, such as to implement a three-stage, folded Clos network with a set of three spine switches connected between a set of lower tier switches (e.g., edge and egress) that is twice as large as the number of spine switches. In this example, each additional lower tier switch can be added using a single cable, while still being fully connected to the spine switches (upper tier).

In an even more asymmetric scaling example 860, FIG. 8(*d*) illustrates a configuration where switches 862 have been added to the lower tier, but the number of new switches is only a fraction of the number of upper tier switches 802. As can be seen, if the network allows it, switches can be added one or more at a time, to either side or both of the transpose box. Each additional switch only requires one cable to connect to the transpose box, with the connectivity being handled by the inner meshing of the transpose box 806.

In some instances, aspects such as cost or size limitations can prevent larger transpose boxes from being implemented initially, where at least a portion of the capacity of a transpose box will not be used right away. In some embodiments, the network architect can direct a technician to replace specific transpose boxes with larger boxes as needed. The network can then be scaled using any of the approaches discussed above. In other embodiments where there cost may prevent boxes from being swapped out unless there is a use for the old box, or for another such reason, it can be possible to introduce additional transpose boxes when scaling the network. Such an approach may not be optimal in all situations, as it can lead to network congestion and other such issues, but can be cheaper to implement and maintain in at least some situations.

Figure 9A:
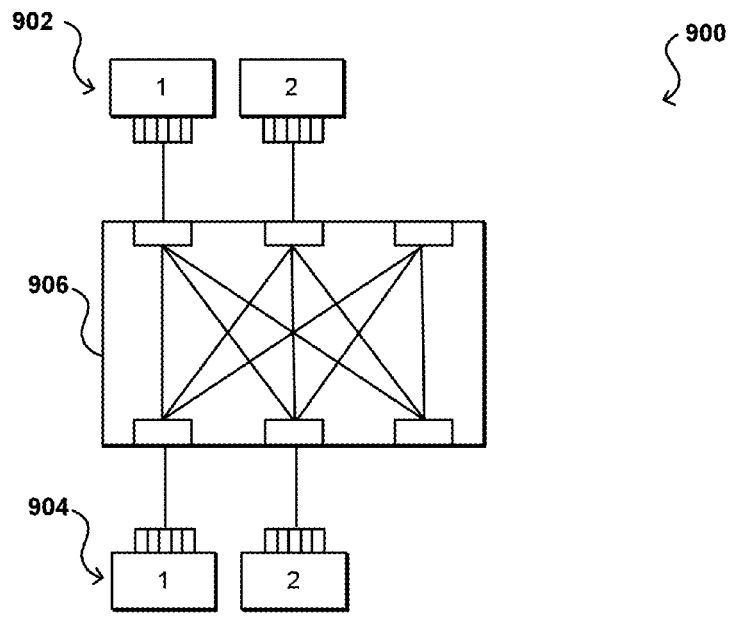
FIGS. 9(a)-9(c) illustrate approaches for deploying at least a portion of a network using one or more transpose boxes that can be used in accordance with various embodiments.
Figure 9B:
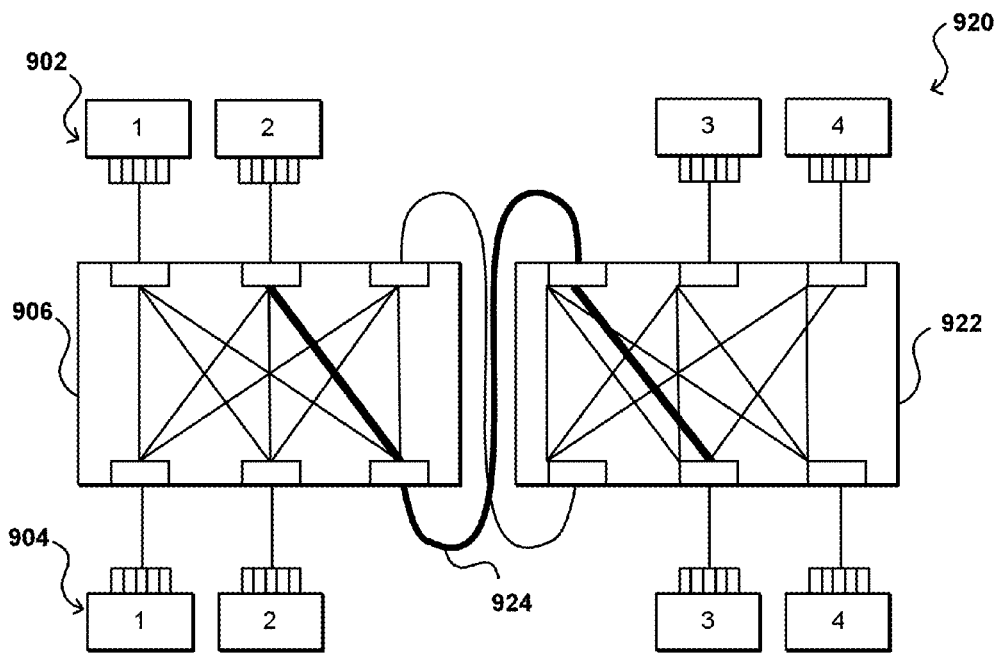

For example, consider the example configuration 900 of FIG. 9(*a*). In this example, a single transpose box 906 is used to connect upper tier switches 902 and lower tier switches 904. Although in some embodiments all the connectors on the transport box are used, in this example there is one connector left available on each logical side of the transpose box. In the network is to be scaled such that two additional switches are to be added to each tier, then another transpose box 922 can be added as illustrated in the example 920 of FIG. 9(*b*). In this example, a second transpose box 922 is added to handle the additional switches. Because the transpose boxes are separate, however, there is no full connectivity between the switches connected to the first transpose box 906 and the switches connected to the second transpose box 922. In this example, an available connector on each of the upper and lower tiers of each transpose box can be used to provide at least one path 924 between the transpose boxes. The path can be implemented using at least one cable, fiber, bundle, additional transpose box, and/or any other appropriate communication or connection device. By linking the boxes in such a way, there is a path between each of the upper tier switches and each of the lower tier switches. As illustrated by the thicker lines in the figure, upper tier switch '2' can connect with lower tier switch '3' using the between-box connection path 924. Further, since the connectors used for the connection path were available, the boxes can be connected using a single cable or pair of cables in some embodiments. As discussed, the connection path 924 can be a point of congestion in certain systems, such that the approach might not be practical for certain implementations. An additional advantage of such an approach, however, is that there is no need to take down any functional part of the network while connecting the additional components. If a smaller network box is swapped out, for example, then the connectivity of that box will be unavailable for a period of the installation. If the original transpose box and connectivity is untouched, however, then there is no such reduction in performance. The transpose boxes in such a situation thus also function as a safety zone when adding capacity. In some cases, the system could be designed with a certain size in mind, but only a portion implemented initially, such as every fourth transpose box at initial deployment. As the network scales, the additional transpose boxes (and other components) can be added as needed. Such an approach also can be used to connect two separate fabrics, as opposed to performing a traditional scaling operation. In such an approach, there would be no need to change any switches in either fabric, as long as the existing switches can be reconfigured as necessary.

Figure 9C:
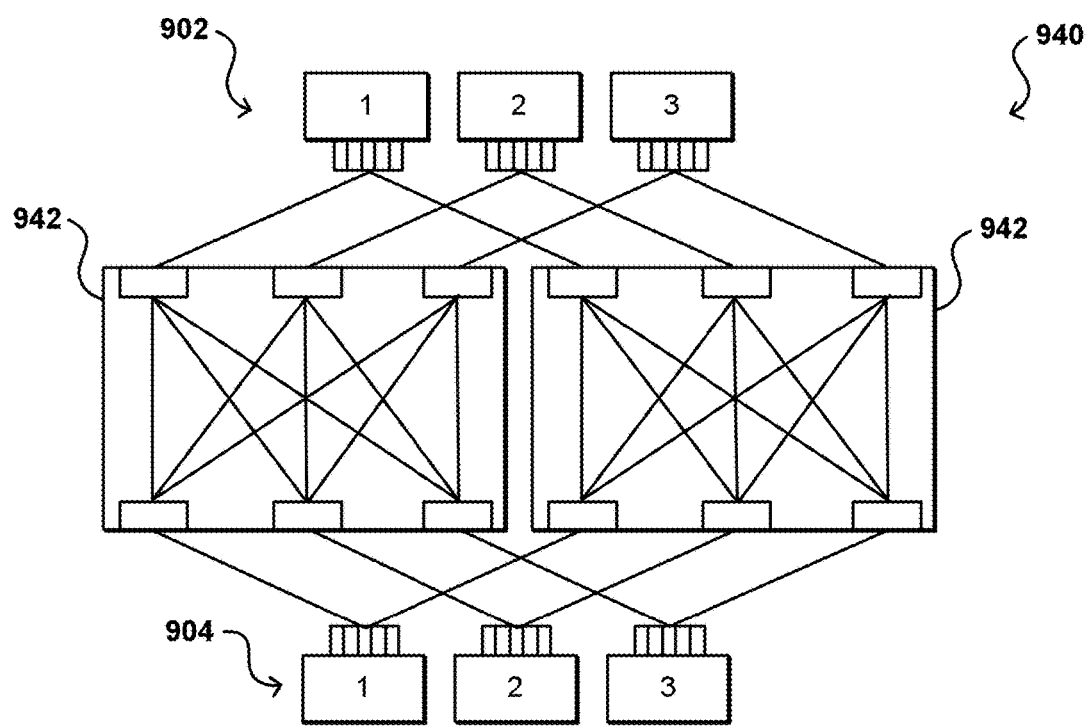

In some embodiments, the additional transpose boxes might be deployed and used for redundancy and/or to prevent a single point of network failure for at least a portion of the network traffic. For example, FIG. 9(c) illustrates an example wherein there are three upper tier switches 902 and three lower tier switches 904 each fully connected by a first transpose box 942. The switches also are connected using a second transpose box 942. Such a deployment provides for redundancy, and enables the network to remain functioning in the event of a problem or removal of one of the transpose boxes. In some embodiments, the redundancy can be built in as part of the design. In other embodiments, the second transpose box 942 can be used for redundancy when possible, and can be used for additional switches when scaling is desired, such as is described with respect to FIG. 9(b). In one embodiment, a group of switches with around twenty-four upper tier switches and around forty-eight lower tier switches might be connected by four transpose boxes (assuming a necessary number of ports, etc.) for purposes of redundancy, even though the group might not be able to further scale according to the current network design.

Figure 10:
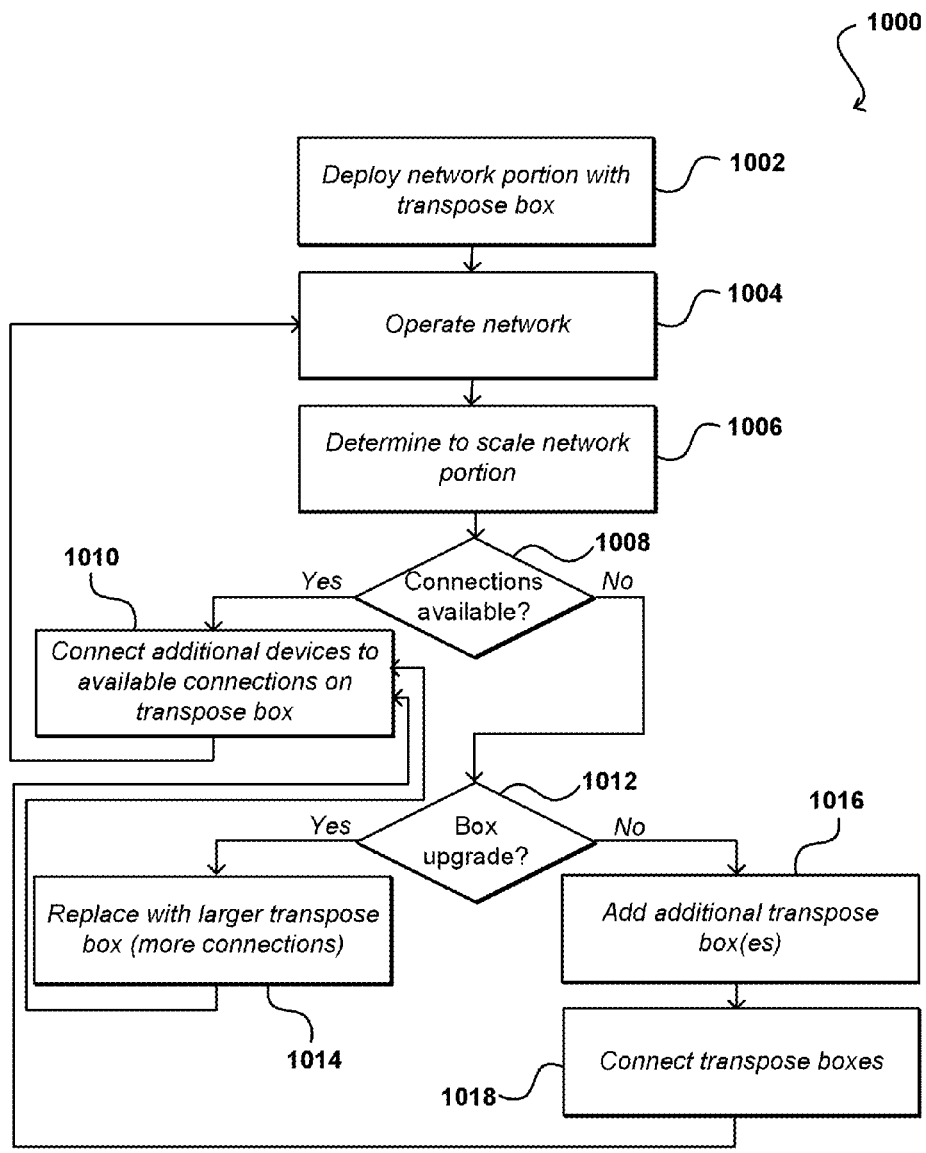
FIG. 10 illustrates an example process for scaling the number of network devices using a transpose box that can be used in accordance with various embodiments.

FIG. 10 illustrates an example process 1000 for scaling a network using transpose boxes that can be used in accordance with various embodiments. In this example, the initial stage of the network design is deployed, including at least one portion with at least one transpose box 1002. Once deployed, the network can operate as intended 1004. At some point, a determination is made to scale up or increase some capacity of the network portion 1006. This determination can be made automatically in some embodiments, such as in response to the detection of capacity threshold being reached or being projected to be reached, and/or can be made manually, such as where a network administrator indicates that capacity is to be increased. Many other such determinations can be made and/or passed along as should be apparent.

In at least some embodiments, a determination is first made as to whether there is an appropriate number of available connections, of the necessary type, to handle the increase 1008. If so, the additional devices (e.g., switches or hosts) or network portions can be connected to the available connectors on the transpose box 1010, and the expanded network can operate as intended. If there are not a sufficient number of available connectors, a determination can be made in at least some embodiments whether an upgraded box is available and/or allowed to be installed in the network portion 1012. If an upgraded box is available and allowable, the transpose box can be replaced with the larger box (at least in terms of connections and not necessarily size) 1014, and the additional devices can be connected as desired. If a larger box cannot be utilized, at least one additional transpose box can be added to the network portion 1016 and the transpose boxes can be connected 1018 as necessary per the selected network topology. As discussed above, the new or additional boxes can be selected at least in part based upon the network topology in addition to the number and/or type of necessary connections. It should be understood that a similar process can be used when the network topology is changed, where additional or alternative transpose boxes are selected to implement the new topology. Further, in some embodiments there can be multiple levels of transpose boxes between network components in order to implement complex topologies.

According to some embodiments, one or more small switches, transpose boxes, and/or other such components can be configured to operate together as a logical switch. More specifically, various switches and transposes boxes can be operated in a manner so as to appear as a single, unified switch. The switches and/or transpose boxes, however, can each be fully independent devices (e.g., each device can have its own CPU, chipset, power supply, operating system, software, etc.). The one or more switches can additionally be diverse with respect to one another (e.g., the devices can have different manufacturers, etc.). As will be shown, by constructing a logical switch using small switches and transpose boxes, the cost of deploying and maintaining a network can be reduced.

Most switches currently in use today are single unit devices made by a particular manufacturer. Such switches typically include strict component requirements, which can make deploying, scaling, and maintaining the switches an expensive endeavor. Illustratively, many switches are based on configurations that include connected line cards housed within a single enclosure. A switch based on such a configuration typically requires all of its line cards to have identical or very similar device characteristics (e.g., the same manufacturer, device model, device version, chipset model, CPU model, form factor, edge connector, etc.). Because of such requirements, compatible line cards must often be obtained from the switch's manufacturer. For this reason, the cost of purchasing and upgrading such a switch can be quite expensive as the manufacturers is able charge a premium on compatible line cards.

Certain embodiments, as discussed, enable the deployment of a logical switch using transpose boxes and small switches with diverse device characteristics. Because developers can source switch components from different manufacturers, competitive price pressures can be created. Such price pressures can drive down overall costs and allow the leveraging of changes in the commodity network components market.

Figure 11:
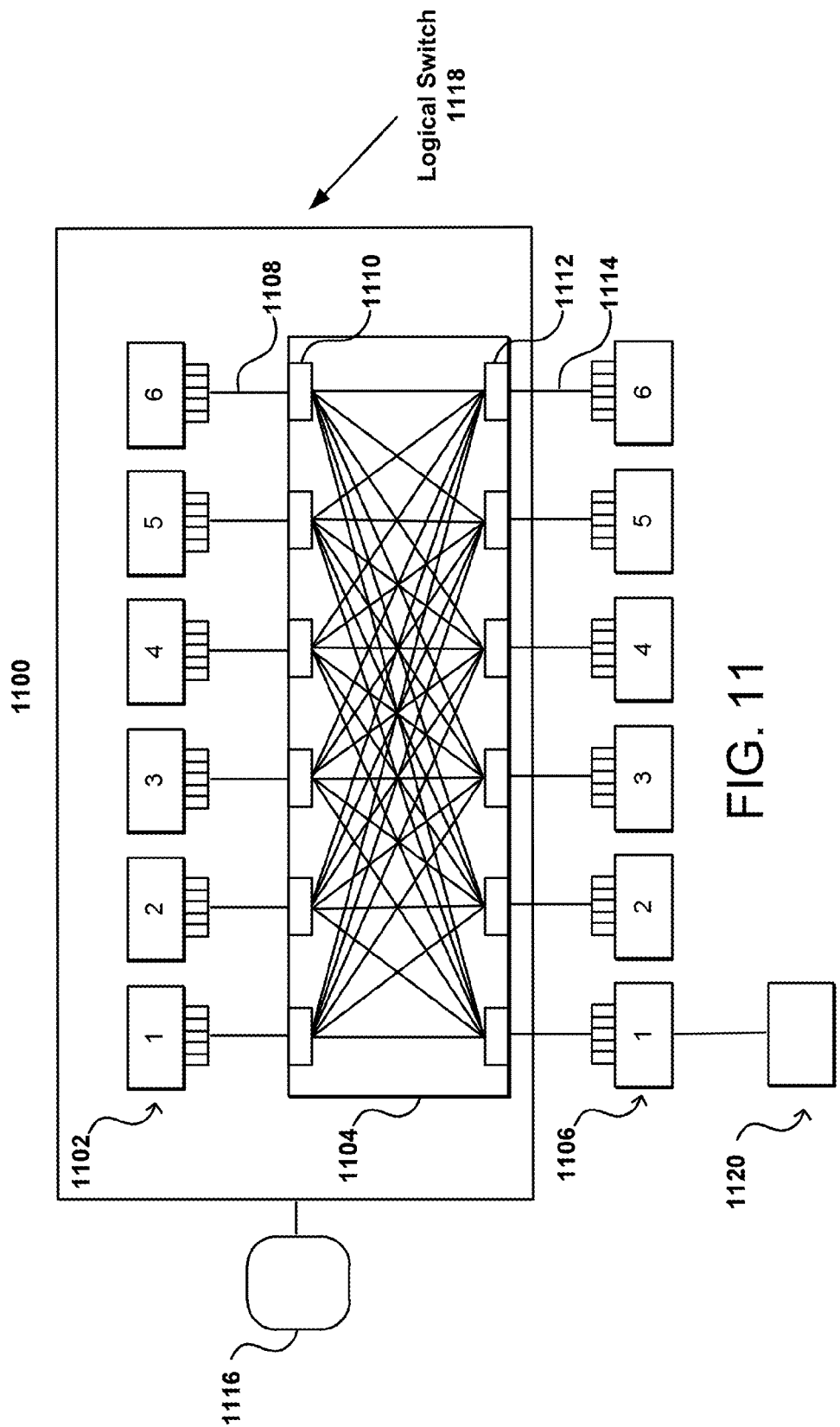
FIG. 11 illustrates an example of a logical switch that can be utilized in accordance with various embodiments.

FIG. 11 illustrates an example configuration 1100 of a logical switch 1118 that can be implemented in accordance with one embodiment. In the example of FIG. 11, logical switch 1118 includes a set of internal switches 1102 and a transpose box 1104. The set of internal switches 1102 are connected to a first logical side of transpose box 1104. Transpose box 1104 is, in turn, connected to a set of external switches 1106 on a second logical side. In connecting to the set of external switches 1106, transpose box 1104 can serve as the "switch box" of logical switch 1118 and can include the switch's "user-facing" ports.

In some embodiments, the set of internal switches 1102 and transpose box 1104 can transmit and receive data based on the same data transmission media and/or standard. For example, the set of internal switches 1102 and transpose box 1104 can communicate based on 10GBASE-KR operation. In certain embodiments, a control server 1116 can be suitably connected to the set of internal switches 1102 and/or transpose box 1104 such that the server can manage the operations of the switches and/or transpose box. In some embodiments, control server 1116 can control the switches and/or transpose box in such a manner as to cause the devices to operate as a single, unified switch.

In some configurations, the set of internal switches 1102 and transpose box 1104 can be fully or partially enclosed within a housing. It should be appreciated, however, that the internal switches are referred to as "internal" insofar as the switches are a part of logical switch 1118 rather than being internally enclosed within a single housing. For example, in certain configurations, the set of internal switches 1102 and transpose box 1104 can be situated on different network equipment racks. As another example, the set of internal switches 1102 and transpose box 1104 can be situated in different buildings, cities, geographic regions, etc.

In some embodiments, each switch in the set of internal switches 1102 can be a fully independent device with its own CPU, power supply, operating system, software packages, etc. In certain embodiments, at least one switch in the set of internal switches 1102 can include a device characteristic that is different from a device characteristic of another switch in the set of internal switches. For instance, the at least one switch can have a different chipset model, CPU model, manufacturer, operating system, operating system version, form factor, device model, device model version, software package, etc. from another switch. As an example, a first switch in the internal set can be a first generation version of a network switch model. A second switch in the internal set can be a second generation version of the network switch model. As another example, a first switch in the internal set can be a switch model produced by a first manufacturer. A second switch in the internal set can be a switch model produced by a second manufacturer.

Each switch in the set of internal switches 1102 can additionally support a signaling protocol such that control server 1116 can control the switch's operation. For example, each switch can support an application programming interface (API) associated with the signaling protocol. During operation, each switch can be responsive to API commands received from control server 1116.

In some embodiments, each switch in the set of internal switches 1102 can be connected to the first logical side of transpose box 1104 via a single network cable. For example, FIG. 11 shows switch 6 of the set of internal switches 1102 as being connected to transpose box 1104 over network cable 1108. Each network cable can include a number of different data transmission paths equal to the number of ports of an internal switch to be connected to transpose box 1104. As discussed, by bundling the different transmission paths into a single cable, and by leveraging a transpose box, deployment of a network can be made simpler and more time efficient. In some embodiments, a network cable can be, for example, a ribbon cable, cable based on twisted pairs, a passive cable, and/or a similar cable with sufficient channel bandwidth for the transmission of data. In order to provide protection from external electromagnetic interference, a network cable can be shielded using a suitable material.

Transpose box 1104 can include any suitable circuitry and/or components for supporting data transmission between the set of internal switches 1102 and the set of external switches 1106. In some embodiments, transpose box 1104 can have components and a configuration similar to transpose box 506 illustrated in FIG. 5. For example, transpose box 1104 can include an internal meshing and an appropriate set of connectors for connecting to one or more network devices (e.g., switches). Illustratively, FIG. 11 shows connector 1110 of transpose box 1104 as connecting the transpose box to switch 6 in the set of internal switches 1102. FIG. 11 additionally shows connector 1112 connecting the transpose box to switch 6 in the set of external switches 1106. In certain embodiments, each connector of transpose box 1104 can be a 12-way or 24-way connector.

As discussed, transpose box 1104 can include at least two logical sides, with each side connecting to a different set of network devices. In some embodiments, the different logical sides of transpose box 1104 can be connected via the aforementioned internal meshing. In doing so, a switch connected to one logical side can transmit data to a switch connected to another logical side. For example, FIG. 11 shows the set of internal switches 1102 connected and configured to exchange data with the set of external switches 1106 via transpose box 1104.

The internal meshing of transpose box 1104 can be implemented in any suitable manner. For example, the internal meshing can be implemented as a set of internal cables, traces on a printed circuit board, etc. In some embodiments, transpose box 1104 can additionally include circuitry and/or components for amplifying signals. For example, transpose box 1104 can include circuitry that amplifies signals so that the transmission of data can be extended to greater distances.

Transpose box 1104 can additionally include circuitry and/or components (such as appropriate PHY chips, transceivers, edge ports, etc) to convert signals. In particular, the set of external switches 1106, in some cases, might use a different data transmission media and/or standard from the set of internal switches 1102. For example, the set of internal switches 1102 might use copper transmission media (e.g., 10GBASE-T, 10GBASE-KR, etc.) for data transmission. The set of external switches 1106, in contrast, might use a fiber-optic transmission media. As such, transpose box 1104 can include circuitry to convert signals and enable data to be transmitted between the internal and external switches.

In such embodiments, the internal meshing of transpose box 1104 can use the same data transmission media and/or standard as the set of internal switches 1102. For example, the set of internal switches 1102 can be configured to transmit and receive data using copper-based transmission media. The internal meshing of transpose box 1104 can, likewise, be implemented using copper-based transmission media. However, transpose box 1104 can include appropriate circuitry and/or components to convert signals prior to transmitting data to or receiving data from the set of external switches 1106. In some embodiments, at least some of the set of external switches 1106 can be connected to external devices (e.g., any device capable of connecting to a network, such as other switches, edge hosts, outside connections, servers, etc.). In FIG. 11, for example, switch 1 of the set of external switches 1106 is connected to external device 1120.

In certain embodiments, transpose box 1104 can additionally support a signaling protocol such that control server 1116 can control the box's operations.

Control server 1116 can include any appropriate hardware and software for managing the operations of logical switch 1118. For example, control server 1116 can be a suitable computer or clusters/groups of computers. Illustratively, control server 1116 can be a cluster of computers capable of providing operational redundancy. In some embodiments, control server 1116 can include one or more processors. Each processor can be, for example, a microprocessor, microcontroller, and/or the like. In some embodiments, the one or more processors can be configured to execute machine-readable instructions stored on a storage unit accessible by the one or more processors. The storage unit can include any suitable volatile and/or non-volatile storage mediums including suitable variations of random access memory (RAM), read-only memory (ROM), hybrid types of memory, storage devices, hard drives, optical disc drives, etc.

As discussed, control server 1116 can be connected to logical switch 1118 in a suitable manner such that control server 1116 can affect the operations of the set of internal switches 1102 and/or transpose box 1104. For example, control server 1116 can be an out-of-band management server that uses a dedicated management channel to communicate with and manage the set of internal switches 1102 and/or transpose box 1104. In some embodiments, the dedicated management channel can be physically separate and isolated from the data channels shown in FIG. 11 (e.g., data transmissions paths between the various sets of switches and transpose box 1104).

Control server 1116 can manage the operations of the set of internal switches 1102 and/or transpose box 1104 using a predefined signaling or routing protocol. The signaling protocol can be any suitable protocol for managing the operations of the set of internal switches 1102 and/or transpose box 1104 (e.g., the open shortest path first protocol). In some embodiments, the signaling protocol can be an open standard protocol or multiple implementations of a proprietary standard protocol. As discussed, each switch in the set of internal switches 1102 and/or transpose box 1104 can support the signaling protocol. During operation, control server 1116 can transmit API commands associated with the signaling protocol in order to control the functions of the switches and/or transpose box. Control server 1116 can manage the operations of the set of internal switches 1102 and/or transpose box 1104 such that the devices appear as a single, unified switch. In some instances, control server 1116 can mange, among other things, the control plane operations for logical switch 1118.

It should be appreciated that while only one network cable is shown as connecting each switch to transpose box 1104, any number of network cables can be used. In some embodiments, the number of network cables used can be significantly less than the number of ports of each switch that are to be connected to transpose box 1104.

Figure 12:
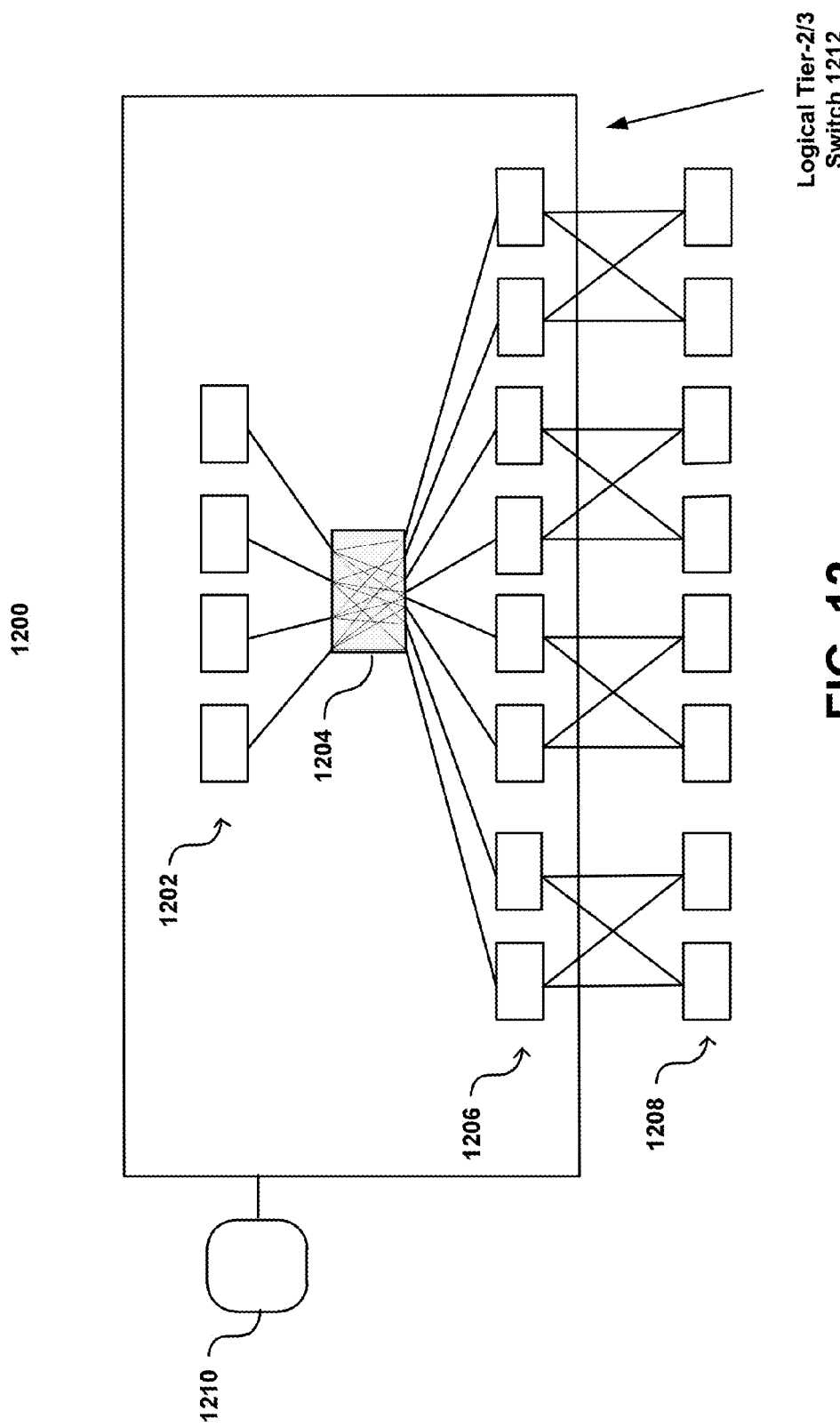
FIG. 12 illustrates an example of a logical tier-2/3 switch that can be utilized in accordance with various embodiments.

FIG. 12 illustrates an example configuration 1200 of a logical tier-2/3 switch 1212 in a three-tier Clos-based network. Logical tier-2/3 switch 1212 includes each switch in upper tier 1202, each switch in middle tier 1206, and transpose box 1204. In the example of FIG. 12, the connections between the upper and middle tiers are made using transpose box 1204. More specifically, each switch in upper tier 1202 is shown as being connected to a first logical side of transpose box 1204. Each switch in middle tier 1206 is additionally shown as being connected to a second logical side of transpose box 1204. Through connecting the upper and middle tier switches in this manner, data transmission paths are established between each switch in the upper tier and each switch in the middle tier. While FIG. 12 shows logical tier-2/3 switch 1212 as including each switch in upper tier 1202, each switch in middle tier 1206, and one transpose box, any number of switches can be connected using any number of transpose boxes.

In some embodiments, data transmission between the switches in upper tier 1202, transpose box 1204, and the switches in middle tier 1204 can be facilitated using the same data transmission media and/or standard. For example, data transmission between the devices can be implemented using a suitable copper-based transmission media (e.g., media suitable for 10GBASE-KR operation).

Each switch in upper tier 1202 and the middle tier 1206 can be a fully independent device with its own CPU, chipset, power supply, operating system, software packages, etc. In some cases, at least one switch in either upper tier 1202 or middle tier 1206 can include a device characteristic that is different from a device characteristic of another switch in either upper tier 1202 or middle tier 1206. For instance, at least one switch can have a different chipset model, CPU model, manufacturer, operating system, operating system version, form factor, device model, device model version, software package, etc. from another switch. Illustratively, a first switch in upper tier 1202 can include a particular device chipset model. A second switch in upper tier 1202 can include a different device chipset model. As another example, a first switch in upper tier 1202 can be a switch based on a particular form factor. A second switch in middle tier 1206 can be a switch based on a different form factor.

In some embodiments, at least one switch in middle tier 1206 can be connected to one or more external devices. For example, FIG. 12 shows each switch in middle tier 1206 as being connected to switches in lower tier 1208. In some embodiments, the switches in lower tier 1208 can be configured to transmit data based on a transmission media and/or standard different from the media and/or standard used in logical tier-2/3 switch 1212. For example, the switches in upper tier 1202, the switches in middle tier 1206, and transpose box 1204 might communicate using copper-based transmission media. The switches in lower tier 1208 might communicate using fiber-optic based transmission media. In order for logical tier-2/3 switch 1212 to communicate with switches in lower tier 1208, each switch in middle tier 1206 can include circuitry and/or components (such as appropriate PHY chips, transceivers, edge ports, etc), to convert signals and enable data transmission with the switches in the lower tier. Due to such a configuration, each switch in middle tier 1206 can have a portion (e.g., half) of its ports configured based on a first data transmission media and/or standard, and another portion (e.g., the other half) configured based on a different data transmission media and/or standard. In some embodiments, at least some of the switches in lower tier 1208 can be connected to external devices.

Transpose box 1204 can have components and a configuration similar to transpose box 1104 illustrated in FIG. 11. In particular, transpose box 1204 can include an internal meshing and an appropriate set of connectors for connecting to one or more network devices (e.g., switches). For example, FIG. 12 shows switches in upper tier 1202 connected to connectors on a first logical side and switches in middle tier 1206 connected to connectors on a second logical side. In some embodiments, the different logical sides of transpose box 1204 can be connected via the aforementioned internal meshing. In doing so, a switch connected to one logical side can transmit data to a switch connected to another logical side.

Control server 1210 can include any appropriate hardware and/or software for managing the operations of logical tier-2/3 switch 1212. In certain embodiments, control server 1210 can have components and a configuration similar to control server 1116 shown in FIG. 11. For example control server 1210 can be an out-of-band management server that uses a dedicated management channel to communicate with and manage the switches in upper tier 1202, the switches in middle tier 1206, and transpose box 1204. In some embodiments, control server 1210 can manage the operations of upper tier switches 1202, transpose box 1204, and/or middle tier switches 1206 using a predefined signaling or routing protocol. In some embodiments, control server 1210 can manage the operations of upper tier switches 1202, transpose box 1204, and/or middle tier switches 1206 such that the devices appear as a single, unified switch. In some instances, control server 1210 can manage, among other things, the control plane operations for logical tier-2/3 switch 1212.

Figure 13:
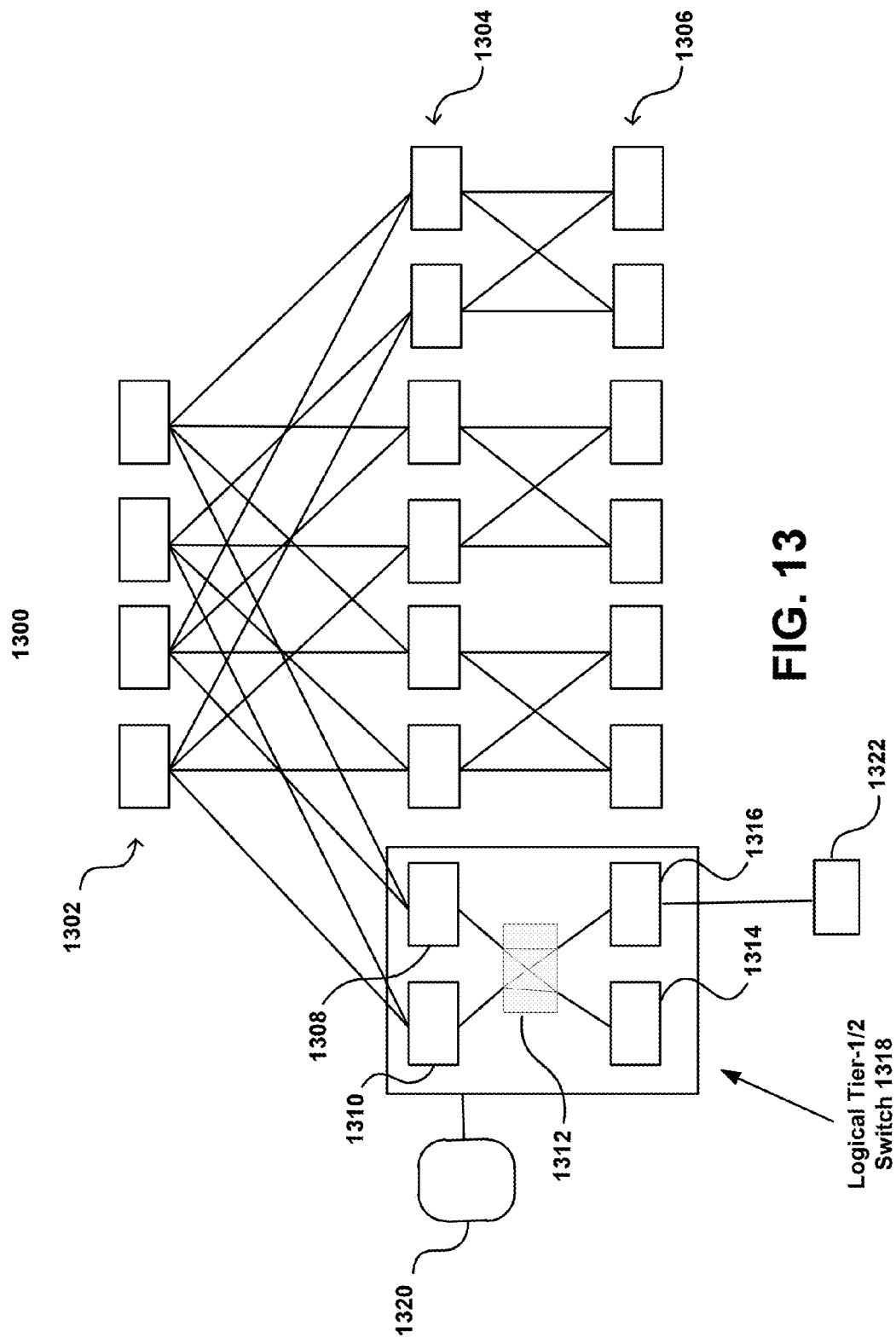
FIG. 13 illustrates an example of a logical tier-1/2 switch that can be utilized in accordance with various embodiments.

FIG. 13 illustrates an example configuration 1300 of a logical tier-1/2 switch 1318 in a three-tier Clos-based network. Logical tier-1/2 switch 1318 includes switches 1308 and 1310 located in the middle tier 1304, switches 1314 and 1316 located in the lower tier 1306, and transpose box 1312.

In the example of FIG. 13, switches 1308 and 1310 located in the middle tier are connected to switches 1314 and 1316 located in the lower tier via transpose box 1312. In particular, switch 1308 and 1310 are shown as being connected to a first logical side of transpose box 1312. Switch 1314 and 1316 are connected to a second logical side of transpose box 1312. By connecting the switches in this manner, data transmission paths between the middle tier switches (i.e. switches 1308 and 1310) the lower tier switches (i.e. switches 1314 and 1316) can be established. While FIG. 13 shows logical tier-1/2 switch 1318 as including only 4 switches and one transpose box, any number of switches can be connected using any number of transpose boxes. In some embodiments, data transmission between switches 1308 and 1310, transpose box 1312, and switches 1314 and 1316 can be facilitated using the same data transmission media and/or standard.

In certain embodiments, switches 1308, 1310, 1314, and 1316 can each be a fully independent device with its own CPU, chipset, power supply, operating system, software packages, etc. In some cases, at least one of switches 1308, 1310, 1314, and 1316 can include a device characteristic that is different from a characteristic of another switch. For instance, at least one switch can have a different chipset model, CPU model, manufacturer, operating system, operating system version, form factor, device model, device model version, software package, etc. from another switch. Illustratively, switch 1314 can include a particular device chipset model. Switch 1316 can include a different device chipset model.

In some embodiments, switches 1308 and 1310 can be connected to one or more external devices. For example, FIG. 13 shows switches 1308 and 1310 as being connected, on one logical side, to one or more switches in upper tier 1302. In some embodiments, the switches in upper tier 1302 can be configured to transmit data based on a transmission media and/or standard different from the media and/or standard used in logical tier-1/2 switch 1318. In order for logical tier-1/2 switch 1318 to communicate with switches in upper tier 1302, switches 1308 and 1310 can include circuitry and/or components (such as appropriate PHY chips, transceivers, edge ports, etc), to convert signals and enable data transmission with the switches in the upper tier. Due to such a configuration, each of switch 1308 and 1310 can have a portion (e.g., half) of its ports configured based on a first data transmission media and/or standard, and another portion (e.g., half) configured based on a different data transmission media and/or standard.

In some embodiments, switches 1314 and 1316 can be connected to one or more external devices. For example, FIG. 13 shows switch 1316 as being connected, on one logical side, to external device 1322. In some embodiments, the external devices can be configured to transmit data based on a transmission media and/or standard different from the media and/or standard used in logical tier-1/2 switch 1318. In order for logical tier-1/2 switch 1318 to communicate with those external devices, switches 1314 and 1316 can include circuitry and/or components (such as appropriate PHY chips, transceivers, edge ports, etc), to convert signals and enable data transmission with the external devices. Due to such a configuration, each of switch 1314 and 1316 can have a portion (e.g., half) of its ports configured based on a first data transmission media and/or standard, and another portion (e.g., half) configured based on a different data transmission media and/or standard.

Transpose box 1312 can have components and a configuration similar to transpose box 1104 illustrated in FIG. 11. In particular, transpose box 1312 can include an internal meshing and an appropriate set of connectors for connecting to one or more network devices (e.g., switches). For example, FIG. 13 shows switches 1308 and 1310 connected to connectors on a first logical side and switches 1314 and 1316 connected to connectors on a second logical side. In some embodiments, the different logical sides of transpose box 1312 can be connected via the aforementioned internal meshing. In doing so, a switch connected to one logical side can transmit data to a switch connected to another logical side.

Control server 1320 can include any appropriate hardware and/or software for managing the operations of logical tier-1/2 switch 1318. In certain embodiments, control server 1320 can have components and a configuration similar to control server 1116 shown in FIG. 11. For example control server 1320 can be an out-of-band management server that uses a dedicated management channel to communicate with and manage the switches 1308 and 1310, the switches, transpose box 1312, and the switches 1314 and 1316. In some embodiments, control server 1320 can manage the operations of the switches and transpose box using a predefined signaling or routing protocol. In some embodiments, control server 1320 can manage the operations of the switches and transpose box such that the devices appear as a single unified switch. In some instances, control server 1320 can manage, among other things, the control plane operations for logical tier-1/2 switch 1318.

Figure 14:
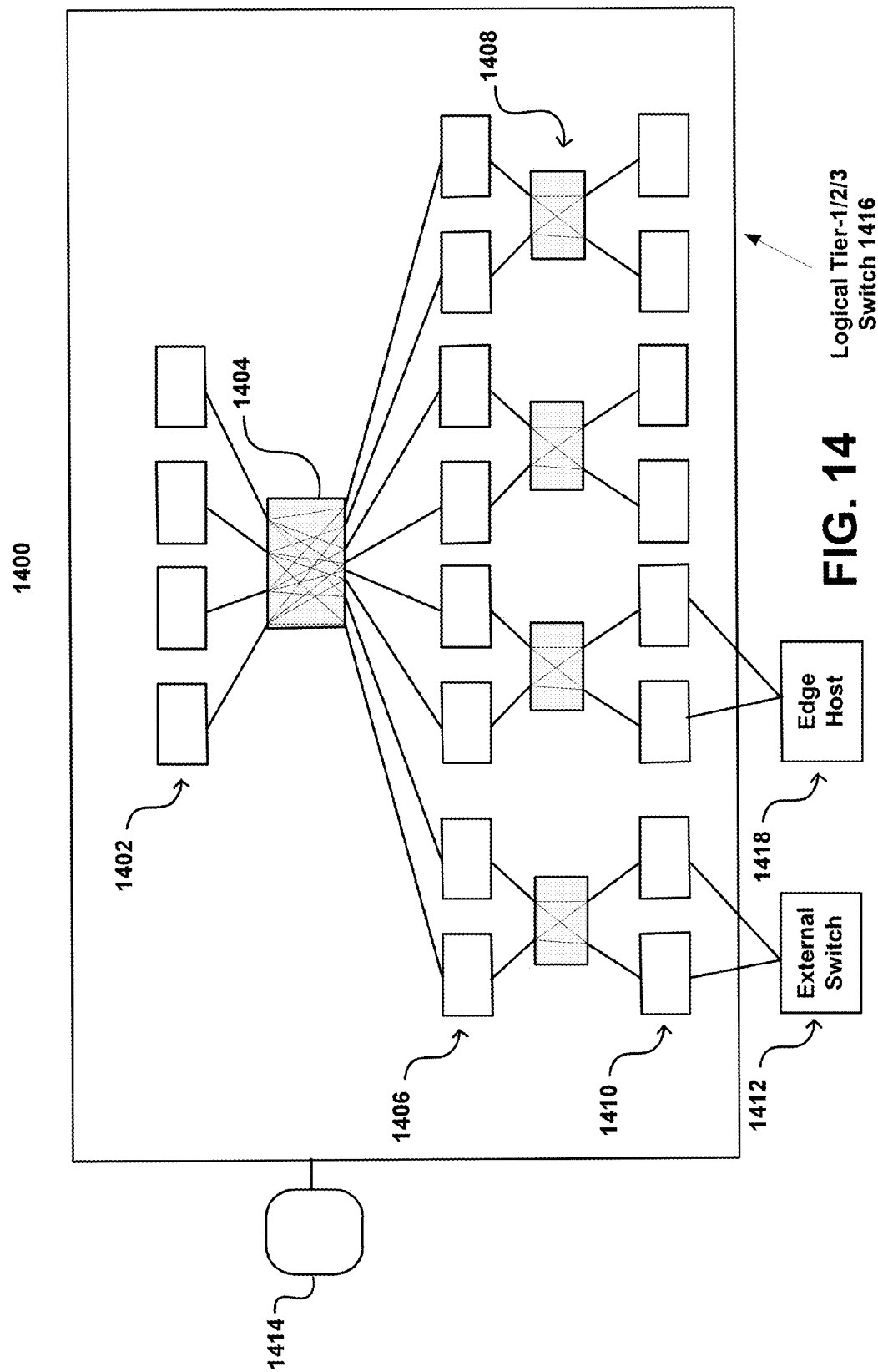
FIG. 14 illustrates an example of a logical tier-1/2/3 switch that can be utilized in accordance with various embodiments.

FIG. 14 illustrates an example configuration 1400 of a logical tier-1/2/3 switch 1416 in a three-tier Clos-based network. Logical tier-1/2/3 switch 1416 includes each switch in upper tier 1402, middle tier 1406, lower tier 1410, transpose box 1404 and set of transpose boxes 1408. In certain embodiments, each switch in logical tier-1/2/3 1416 can be a fully independent device with its own CPU, device components, power supply, operating system, software packages, etc. In some cases, at least one of switch can include a device characteristic that is different from a device characteristic of another switch. For instance, at least one switch can have a different chipset model, CPU model, manufacturer, operating system, operating system version, form factor, device model, device model version, software package, etc from another switch.

As shown in FIG. 14, the switches in the upper tier and the switches in the middle tier can be connected via a transpose box 1404. The manner in which the upper tier switches, middle tier switches, and transpose box 1404 are configured and operate can be similar to the manner described for the configuration and operation of the upper tier switches, middle tier switches, and transpose box illustrated in FIG. 12. As further shown in FIG. 14, the switches in the middle tier and the lower tier can be connected via a set of transpose boxes 1408. The manner in which the switches in the middle tier and the switches in the lower tier are configured and operate can be similar to the manner described for the configuration and operation of middle tier switches 1308/1310, transpose box 1312 and lower tier switches 1314/1316 illustrated in FIG. 13. In some cases, communication between the devices of logical tier-1/2/3 switch 1416 can be facilitated using the same transmission media and/or standard.

At least some of the switches in lower tier 1410 can include circuitry and/or components for directly connecting with servers, external switches, edge hosts, outside connections, etc. (e.g., external switch 1412 and edge host 1418 shown in FIG. 4). In certain embodiments, devices external to logical tier-1/2/3 switch 1416 can communicate based on transmission media and/or a standard different from the media and/or standard used by logical tier-1/2/3 switch 1416. As a result, at least some of the switches in lower tier 1410 can include components and/or circuitry (such as appropriate PHY chips, transceivers, edge ports, etc) to convert signals and enable data transmission with external network devices. Due to such configurations, at least some of the switches in lower tier 1410 of logical tier-1/2/3 switch 1416 can each have a portion (e.g., half) of its ports configured for a first data transmission media and/or standard and another portion (e.g., the other half) configured based on a different data transmission media and/or standard.

In some embodiments, control server 1414 can include any appropriate hardware and/or software for managing the operations of logical tier-1/2/3 1416. In certain embodiments, control server 1414 can have components and a configuration similar to control server 1116 shown in FIG. 11. For example, control server 1414 can manage the operations of the switches and transpose box of logical tier-1/2/3 1416 such that the devices appear as a single logical switch unit. In some instances, control server 1414 can manage, among other things, the control plane operations for logical tier-1/2/3 1416.

In some embodiments, logical tier-1/2/3 switch 1416 can be of sufficient size as to be enclosed within a housing. More specifically, all cabling and/or wiring between the three tiers and the transpose boxes can be internal to a chassis and all internal data transmission can be efficiently run based on the same data transmission media and/or standard. Through building a logical tier switch as shown in FIG. 14, a high-port count switch can be constructed using relatively cost effective and easily interchangeable parts.

It should be understood that while the network and device configurations illustrated in FIGS. 11-14 show very specific implementations of logical switches, different configurations can be used.

Furthermore, it should be understood that while many of the network, device, and connection configurations described herein facilitate data transmission based, in part, on copper-based media, any number of different transmission media can be used. For example, the network and device configurations illustrated in FIGS. 11-14 can facilitate data transmission based on fiber-optics.

Moreover, it should be understood that the various network configurations illustrated in FIGS. 11-14 can be deployed using any suitable process. For example, the network configurations can be deployed in a manner similar to the deployment process shown in FIG. 7.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, solid state drives (SSD) which use solid state flash memory like Single-Level Cell (SLC) and Multi-Level Cell (MLC), or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A data transmission system, comprising:
   a first tier of network switches, each network switch in the first tier receiving and transmitting data over a network;
   a second tier of network switches, each network switch in the second tier receiving and transmitting data from at least one of the network switches in the first tier of network switches;
   a third tier of network switches, each network switch in the third tier of network switches receiving and transmitting data over a network;
   a fourth tier of network switches, each network switch in the fourth tier receiving and transmitting data over a network;
   a first network transpose box comprising a first group of network connectors and a second group of network connectors within the first network transpose box, each of the first group of network connectors being connected by a single cable to each of the second group of network connectors within the first network transpose box such that the first group of network connectors and the second group of network connectors are fully connected; and
   a second network transpose box comprising a third group of network connectors and a fourth group of network connectors within the second network transpose box, each of the third group of network connectors being connected by a single cable to each of the fourth group of network connectors within the second network transpose box,
   wherein a data transmission path between any of the network switches in the first tier and any of the network switches in the second tier is provided by a single connection between each network switch in the first tier and the first network transpose box and a single connection between each network switch in the second tier and the first network transpose box,
   wherein a data transmission path between any of the network switches in the first tier and any of the network switches in the fourth tier is provided by a single connection between each network switch in the first tier and the first network transpose box, a single connection between each network switch in the fourth tier and the second network transpose box, and a single connection between the first network transpose box and the second network transpose box.

2. The data transmission system of claim 1, wherein the first network transpose box is associated with a particular network topology, and wherein the first group of network connectors and the second group of network connectors of the first network transpose box are connected according to the particular network topology.

3. The data transmission system of claim 1, wherein each cable within the first network transpose box connecting the first group of network connectors and the second group of network connectors does not have an outer protection layer.

4. The data transmission system of claim 1, further comprising:
   a control server configured to manage a flow of data through the first network transpose box by operating a first subset of the first tier of network switches and a first subset of the second tier of network switches, wherein the control server is further configured to operate the first subset of the first tier of network switches and the first subset of the second tier of network switches using a dedicated management channel.

5. The data transmission system of claim 1, wherein the data transmission path between any of the network switches in the first tier and any of the network switches in the second tier remains active upon removal of either the first network transpose box or the second network transpose box.

6. The data transmission system of claim 1, wherein the first tier of network switches and the second tier of network switches are connected to the first network transpose box using connectors on a single side of the first network transpose box, a first subset of connectors being used for the first tier of network switches having a first keying approach and a second subset of connectors being used for the second tier of network switches having a second keying approach different from the first keying approach.

7. The data transmission system of claim 6, wherein the first keying approach comprises the first subset of connectors having a notch in a first location and the second keying approach comprises the second subset of connectors having a notch in a second location, such that a cable connector connecting to the first subset of connectors cannot connect to the second subset of connectors.

8. The data transmission system of claim 1, wherein the single connection between each network switch in the first tier and the first network transpose box is provided by a single cable, the single cable comprising a fiber bundle that includes at least one fiber for each network switch in the first tier.

9. The data transmission system of claim 1, wherein the single connection between each network switch in the first tier and the first network transpose box is provided by a single cable, the single cable comprising a fiber bundle that includes a number of fibers equal to a total number of ports on all of the network switches in the second tier.

10. The data transmission system of claim 1, wherein the first network transpose box further comprises at least one straight pass-through connection.

11. The data transmission system of claim 1, wherein at least one switch in either the first tier of network switches or the second tier of network switches includes a device characteristic that is different from a device characteristic of a different switch in either the first tier of network switches or the second tier of network switches.

12. The data transmission system of claim 11, wherein a device characteristic is a manufacturer, operating system, or form factor.

13. The data transmission system of claim 11, wherein a device characteristic is a device model, device model version, chipset model, CPU model, or operating system version.

14. The data transmission system of claim 1, wherein the first tier of network switches use a first data transmission media and the second tier of network switches use a second data transmission media different from the first data transmission media, and wherein the first network transpose box further comprises:
one or more components to convert a signal between the first data transmission media and the second data transmission media.

15. A method of deploying a data transmission network, comprising:
selecting a network topology for at least a portion of the data transmission network;
selecting a first tier of network switches, each network switch in the first tier receiving and transmitting data over a network;
selecting a second tier of network switches, each network switch in the second tier receiving and transmitting data from at least one of the network switches in the first tier of network switches;
selecting a third tier of network switches, each network switch in the third tier receiving and transmitting data from at least one of the second tier of network switches;
selecting a first network transpose box configured to implement the selected network topology, the first network transpose box comprising a first group of network connectors and a second group of network connectors within the first network transpose box, each of the first group of network connectors being connected by a single cable to each of the second group of network connectors within the first network transpose box such that the first group of network connectors and the second group of network connectors are fully connected; and
selecting a second network transpose box comprising a third group of network connectors and a fourth group of network connectors, at least a portion of the third group of network connectors each being connected to two or more of the fourth group of network connectors, at least a portion of the fourth group of network connectors each being connected to two or more of the third group of network connectors, wherein a data transmission path between any of the network switches in the first tier and any of the network switches in the second tier is provided by a single connection between each network switch in the first tier and the first network transpose box and a single connection between each network switch in the second tier and the first network transpose box,
wherein each of a subset of network switches of the second tier of network switches is connected to at least one of the third group of network connectors and each of a subset of network switches of the third tier of network switches is connected to at least one of the fourth group of network connectors,
wherein multiple switches of the second tier are each connected to multiple switches of the third tier via the second network transpose box, and
wherein the subset of the third tier of network switches operate with a subset of the first tier of network switches and the subset of the second tier of network switches as a logical switch.

16. The method of claim 15, wherein each of the subset of network switches of the second tier of network switches is connected to at least one of the third group of network connectors using a single network cable, and each of the subset of network switches of the third tier of network switches is connected to at least one of the fourth group of network connectors using a single network cable.

17. The method of claim 15, wherein the first network transpose box further comprises at least one straight pass-through connection.

18. The method of claim 15, wherein the data transmission path between any of the network switches in the first tier and any of the network switches in the second tier remains active upon removal of either the first network transpose box or the second network transpose box.

19. The method of claim 15, wherein each cable within the first network transpose box connecting the first group of network connectors and the second group of network connectors does not have an outer protection layer.

20. A network transpose box, comprising:
a physical support structure;
a first set of network connectors supported by the physical support structure, wherein the first set of network connectors are separated into a first logical group and a second logical group, each logical group containing a plurality of the first set of network connectors; and
a plurality of physical connection media situated inside the network transpose box, each of the first logical group of network connectors being connected by a single instance of the physical connection media to each of the second logical group of network connectors within the network transpose box such that the first logical group of network connectors and the second logical group of network connectors are fully connected, wherein the physical connection media does not have an outer protection layer,
wherein a data transmission path between any network switches in a first tier of network switches and any network switches in a second tier of network switches is provided by a single connection between each network switch in the first tier and the network transpose box and a single connection between each network switch in the second tier and the network transpose box,
wherein a data transmission path between any network switches in the first tier of network switches and any network switches in a third tier of network switches is provided by a single connection between each network switch in the first tier and the network transpose box, a single connection between each network switch in the third tier and a different network transpose box, and a single connection between the network transpose box and the different network transpose box.

* * * * *